(12) United States Patent
Bhaskaracharya et al.

(10) Patent No.: US 9,098,307 B2
(45) Date of Patent: Aug. 4, 2015

(54) REARRANGEMENT OF ALGEBRAIC EXPRESSIONS BASED ON OPERAND RANKING SCHEMES

(75) Inventors: Somashekaracharya G. Bhaskaracharya, Bangalore (IN); Darren R. Schmidt, Cedar Park, TX (US); Adam L. Bordelon, Austin, TX (US)

(73) Assignee: National Instruments Corporation, Austin, TX (US)

( * ) Notice: Subject to any disclaimer, the term of this patent is extended or adjusted under 35 U.S.C. 154(b) by 216 days.

(21) Appl. No.: 13/189,275

(22) Filed: Jul. 22, 2011

(65) Prior Publication Data

US 2013/0024848 A1 Jan. 24, 2013

(51) Int. Cl.
G06F 9/44 (2006.01)
G06F 9/45 (2006.01)

(52) U.S. Cl.
CPC ..................................... G06F 8/443 (2013.01)

(58) Field of Classification Search
CPC ...................................................... G06F 8/443
USPC .................................................. 717/147, 152
See application file for complete search history.

(56) References Cited

U.S. PATENT DOCUMENTS

| | | | | |
|---|---|---|---|---|
| 5,262,968 A | * | 11/1993 | Coffield | 708/5 |
| 5,274,818 A | * | 12/1993 | Vasilevsky et al. | 717/149 |
| 6,952,820 B1 | * | 10/2005 | Schultz et al. | 717/151 |
| 7,571,435 B2 | * | 8/2009 | Gustavson et al. | 717/161 |
| 7,676,799 B1 | * | 3/2010 | Panchenko et al. | 717/159 |
| 8,104,027 B2 | * | 1/2012 | Owen et al. | 717/146 |
| 2003/0101441 A1 | * | 5/2003 | Harrison et al. | 717/152 |
| 2006/0080645 A1 | * | 4/2006 | Miranda et al. | 717/137 |
| 2008/0072215 A1 | * | 3/2008 | Boyd et al. | 717/137 |
| 2008/0127152 A1 | * | 5/2008 | Bera | 717/159 |
| 2011/0138373 A1 | * | 6/2011 | Lane et al. | 717/157 |
| 2013/0024848 A1 | * | 1/2013 | Bhaskaracharya et al. | 717/147 |

OTHER PUBLICATIONS

Briggs, Applicant Supplied Prior art IDS Dec. 20, 2012 No. 2 (Published 1994).*

(Continued)

*Primary Examiner* — Don Wong
*Assistant Examiner* — Theodore Hebert
(74) *Attorney, Agent, or Firm* — Meyertons Hood Kivlin Kowert & Goetzel, P.C.; Jeffrey C. Hood; Mark K. Brightwell

(57) ABSTRACT

A system and method for rearranging algebraic expressions occurring in program code based on a scheme of ranking operands. The system scans program code to identify an algebraic expression specified by the program code. The expression includes binary operations, scalar operands and at least one array operand. The system operates on the algebraic expression to obtain a final expression by: computing a rank for each of the operands; and performing algebraic transformations on selected subexpressions of the algebraic expression so that in the final expression operands are combined in the order of their rank. The ranking scheme may be designed to force scalars to be combined before arrays, and/or, to force constants to be combined first, loop invariants second, and variants last. In some embodiments, the ranking scheme is a vector ranking scheme including two or more components (such as invariance rank, dimensional rank and data-size rank).

20 Claims, 21 Drawing Sheets

```
t = IntegerInputFromUser
For i = 1 to M
    For j = 1 to N
        vb = function1(i,j)
        Lc = function2(i)
        vd = function3(i,j)
        L₂e = Abs(t)  // absolute value of operand t
        Lg = function4(i)
        W = (((ca+vb)+(Lc+vd))+(L₂e+cf))+Lg
    Endfor
Endfor
```

(56) References Cited

OTHER PUBLICATIONS

Hoisting, Compiler Optimizations (Published Oct. 14, 2007), retrieved from Internet archive wayback machine snapshot for http://compileroptimizations.com/category/hoisting.htm on May 3, 2013.*

Johnson, Code Optimization (Published Aug. 4, 2008), retrieved from http://dragonbook.stanford.edu/lecture-notes/Stanford-CS143/20-Optimization.pdf on Nov. 14, 2014.*

Cooper et al.; "Redundancy Elimination Revisited;" Proceedings of the 17th International Conference on Parallel Architectures and Compilation Techniques (PACT '08), Toronto, Ontario, Canadia, Oct. 25-29, 2008, retrieved from <http://cscads.rice.edu/publications.pdfs/p12-cooper.pdf> on Dec. 19, 2012; pp. 12-21.

Briggs, Preston; Cooper, Keith D.; "Effective Partial Redundancy Elimination;" PLDI '94 Proceedings of the ACM SIGPLAN 1994 Conference on Programming Language Design and Implementation, Jun. 1994, ACM, New York, NY, retrieved from <http://www.cs.virginia.edu/kim/courses/cs771/papers/briggs94effective.pdf> on Dec. 19, 2012; pp. 159-170.

Cooper, Keith D.; "Algebraic Reassociation of Expressions;" Lecture Notes from Spring 2011 Course at Rice University, Jan. 1, 2011, retrieved from <http://www.cs.rice.edu/~keith/512/2011/Lectures/L08Reassoc-1up.pdf> on Dec. 19, 2012; pp. 1-18.

Cooper, Keith D.; "Algebraic Reassociation, Revisited: Beyond rank ordering schemes;" Lecture Notes from Spring 2011 Course at Rice University, Jan. 1, 2011, retrieved from <http://www.cs.rice.edu/~keith/512/Lectures/26Reassocll-1up.pdf> on Dec. 19, 2012; pp. 1-20.

"Strength reduction;" Wikipedia, version from Apr. 28, 2011, retrieved from <http://en.wikipedia.org/w/index.php?title=Strength_reduction&oldid=426340373> on Dec. 19, 2012; pp. 1-10.

"Constant folding;" Wikipedia, version from Dec. 28, 2010, retrieved from <http://en.wikipedia.org/w/index.php?title=Constant_folding&oldid=40480792> on Dec. 19, 2012; pp. 1-4.

"Loop-invariant code motion;" Wikipedia, version from Oct. 20, 2010, retrieved from <http://en.wikipedia.org/w/index.php?title=Loop-invariant_code_motion&oldid=391852761> on Dec. 19, 2012; pp. 1-2.

Lee, Peter; "Local Optimizations;" Handout from Spring 2006 Course at Carnegie Mellon University, Jan. 24, 2006, retrieved from <http://www.cs.cmu.edu/afs/cs/academic/class/15745-s06/web/handouts/03.pdf> on Dec. 19, 2012; pp. 1-6.

Lee, Peter; "Loop-invariant Code Motion;" Handout from Spring 2006 Course at Carnegie Mellon University, Feb. 2, 2006. retrieved from <http://www.cs.cmu.edu/afs/cs/academic/class/15745-06/web/handouts/06.pdf> on Dec. 19, 2012; pp. 1-8.

Lee, Peter; "Classical Loop Optimizations;" Handout from Spring 2006 Course at Carnegie Mellon University, Feb. 9, 2006, retrieved from <http://www.cs.cmu.edu/afs/cs/academic/class/15745-s06/web/handouts/07.pdf> on Dec. 19, 2012; pp. 1-16.

* cited by examiner

```
t = IntegerInputFromUser
For i = 1 to M
        For j = 1 to N
                vb = function1(i,j)
                Lc = function2(i)
                vd = function3(i,j)
                L₂e =  Abs(t)   // absolute value of operand t
                Lg = function4(i)
                W = (((ca+vb)+(Lc+vd))+(L₂e+cf))+Lg
        Endfor
Endfor
```

FIG. 1A

```
t = IntegerInputFromUser
For i = 1 to M
        For j = 1 to N
                vb = function1(i,j)
                Lc = function2(i)
                vd = function3(i,j)
                L₂e = Abs(t)
                Lg = function4(i)
                W = vb+(vd+(Lc+(Lg+(L₂e+(ca+cf)))))
        Endfor
Endfor
```

FIG. 1B

```
t = IntegerInputFromUser
L₂e = Abs(t)
For i = 1 to M
        Lc = function2(i)
        Lg = function4(i)
        L = Lc + Lg
        For j = 1 to N
                vb = function1(i,j)
                vd = function3(i,j)
                W = vb+(vd+(L+(L₂e+c)))
        Endfor
Endfor
```

FIG. 1C

*IsCoercionHappeningOn (Node binop) : Boolean*

*RETURN ( type( y(binop)) ≠ type( x(binop) )*

FIG. 2

*IsOpReassociable(BinOp op) : Boolean*

*RETURN   op is 'Add' OR*
   *op is 'MUL' OR*
   *op is 'OR' OR*
   *op is 'XOR' OR*
   *op is 'AND' OR*
   *op is 'SUB'  // Note: SUB denotes the subtraction operator.*

FIG. 3

*IsTypeFeasibleForReassociation(Terminal t) : Boolean*

*RETURN true if binop associated with t is Commutative AND Associative for type(t)*

FIG. 4

AlgebraicReassociationTransform(BlockDiagram BD)

For each node n in N(BD)

if the node n is a structure then:

call AlgebraicReassociationTransform(n)

else IsBinOp(n) AND IsOpReassociable(n)

Sweep through the block diagram BD along all possible upstream paths starting from the binop n and along all possible downstream paths starting from binop n in order to collect all reassociable binops along those paths. A path terminates if there is no next node along the path or the next node is not a reassociable binop. "Downstream" means "in the direction of dataflow" in the block diagram. "Upstream" means "against the direction of dataflow" in the block diagram.

Mark all the reassociable binops that are collected in the sweep.

Consider only the node that is most downstream among those marked in the sweep; add such a node to a list of nodes where algebraic reassociation is to begin.

endif

For every node in the list of nodes gathered where reassociation is to begin call DoReassociation(binop)

FIG. 5

DoReassociation (Node binop) : Rank
        rank KVARIANT    // rank defaults to lowest rank (i.e., to the
                                        // highest numeric rank value)
        IF IsTypeFeasibleForReassociation(z(binop)) THEN
            rank Reassociate(binop)
        ENDIF
        RETURN rank

FIG. 6

Rank (Terminal x) : Rank

// Note: kVARIANT > kloopInvariance > KNONVARIANT.
// Lower numeic rank value means higher rank.

IF value(x) is a constant THEN
   rank KNONVARIANT
ELSEIF value(x) is loop-invariant THEN
    rank kloopInvariance(depth) // calculated based on depth
                                             // of loop-invariance
ELSEIF IsOpReassociable( source(x) ) THEN
   rank DoReassociation(source(x))
ELSE
    rank KVARIANT
ENDIF
RETURN rank

*FIG. 7*

Associate (BinOp A, BinOp B) : Rank

// A and B are binops. ((p B q) A r) is transformed to p A (q B r).
Swap ( y(B), x(B) )
Swap ( y(A), x(A) )
Swap ( y(A), x(B) )
rank Reassociate (A)
RETURN rank

*FIG. 8*

Commutate(BinOp A)

IF A is "subtraction" THEN
        IF x(A) is "constant" THEN
            Replace A(x,y) with ADD(y, -x)
        ENDIF
    ELSE
        SWAP( x(A), y(A) )
    ENDIF

*FIG. 9*

*Reassociate(BinOp binop) : Rank*

*xInputRank Rank(xInput)*
    *rank yInputRank Rank(yInput)*

*IF IsCoercionHappeningOn(binop) THEN*
        *RETURN max(xInputRank,yInputRank)*
    *ENDIF*

*// Conditional Application of Commutativity*
    *IF xInputRank > yInputRank THEN //swap inputs*
        *Call Commutate( binOp )*
        *IF binop is subtraction THEN*
         *RETURN xInputRank*
        *ELSE*
         *rank xInputRank;*
         *swap(xInputRank, yInputRank)*
        *ENDIF*

*ELSEIF binop is subtraction THEN*
        *RETURN xInputRank // since subtraction is not associative*
    *ENDIF*

*// Conditional Application of Associativity*
    *IF*
        *yInputSourceBinop = yInput's source binop exists*
        *// there is a binop feeding the y input terminal*
        *AND !IntermediateResultNecessary(yInputSourceBinop)*
        *// the intermediate result produced by this binop is consumed*
        *// as an input only once in the program code*
        *AND yInputSourceBinop is same kind of operation as binop*
        *// if this binop is of a similar kind, apply the rule of associativity*
        *AND if(!IsCoercionHappeningOn(yInputSourceBinop)) THEN*
         *rank = Associate(binop, yInputSourceBinop)*

*RETURN rank*

*FIG. 10*

*Associate (BinOp A, BinOp B) : Rank*
    // *A and B are binops. The structure "(p B q) A r" is transformed*
    // *to the structure "p A (q B r)".*
    *Swap( y(B), x(B) )*
    *Swap( y(A), x(A) )*
    *Swap( y(A), x(B) )*
    *RunTypeProp(B)*
    *RunTypeProp(A)*
    *RETURN Reassociate(A)*

FIG. 13

Reassociate(BinOp binop) : Rank xInputRank Rank(xInput)

rank yInputRank Rank(yInput)

// Commutativity
    IF xInputRank > yInputRank THEN //swap inputs by law of commutativity Call Commutate( binOp )

IF binop is subtraction THEN
          RETURN xInputRank

ELSE
          rank xInputRank;
          swap(xInputRank, yInputRank)

ENDIF

// Associativity
    ELSEIF binop is subtraction THEN
        RETURN xInputRank as subtraction is not associative
    ENDIF // Applying rules of associativity

IF yInputSourceBinop = yInput's source binop exists
        // there is a binop feeding the y input terminal
        AND !IntermediateResultNecessary(yInputSouceBinop)
        // the intermediate result produced by this binop is consumed
        // as an input only once in the program code
        AND yInputSourceBinop is same kind of operation as binop
        // if this binop of a similar kind rank = Associate(binop, yInputSourceBinop)

RETURN rank

FIG. 14

```
ScalarArrayCommutatePossible(BinOp binop) : Boolean
    scalarArrayCommutatePossible  false
    IF  binop ≠ subtraction AND
        ( y(binop) is not an array ) AND ( x(binop) is an array ) THEN
            IF  xSourceBinop = binop sourcing xInput exists AND
                !IntermediateResultNecessary(xSourceBinop) THEN
                xInput  xSourceBinop's xInput
                yInput  xSourceBinop's yInput
                IF ( xInput is Array) XOR ( yInput is Array) THEN
                // scalar + array  OR array + scalar
                        IF ( yInput=Array AND Rank(yInput)≥Rank(xInput))
                        OR ( xInput =Array AND Rank(xInput)≥Rank(yInput))
                        THEN
                                scalarArrayCommutatePossible  true
                                IF xInput is Array THEN
                                    SwapInputs(xSourceBinop)
                                ENDIF
                        ENDIF
                ENDIF
            ENDIF
    ENDIF
    RETURN scalarArrayCommutatePossible
```

*FIG. 16*

*Reassociate(BinOp binop): Rank*

```
// If input pair (p,q) of binop does not satisfy the condition
// rank( yterm input ) >= rank ( xterm input ), then commute the operands
// p and q so that the condition will be satisfied.
xInputRank  Rank(xInput)
rank  yInputRank  Rank(yInput)
CommutateControl  (xInputRank > yInputRank)
IF xInputRank = yInputRank THEN
        CommutateControl  ScalarArrayCommutatePossible(binop)
ENDIF // Commutativity
IF CommutateControl THEN
        Call Commutate( binOp )
        IF binop is subtraction THEN
           RETURN xInputRank
        ELSE
           rank  xInputRank;
           swap(xInputRank, yInputRank)
        ENDIF
// Associativity
ELSEIF binop is subtraction THEN
        RETURN xInputRank // since subtraction is not associative
ENDIF // Applying rules of associativity
IF
        yInputSourceBinop = yInput's source binop exists
        // there is a binop feeding the y input terminal
        AND !IntermediateResultNecessary(yInputSouceBinop)
        // the intermediate result produced by this binop is consumed
        // as an input only once
        AND yInputSourceBinop is same kind of operation as binop
                rank = Associate(binop, yInputSourceBinop)

RETURN rank
```

FIG. 17

(The block diagram above can be transformed to the following block diagram.)

*DoReassociation (BinOp binop): Rank*
    *rank <KVARIANT, array, KLargestDataType>*
    *// Default to the vector of lowest rank*
    *IF IsTypeFeasibleForReassociation(z(binop)) THEN*
      *rank Reassociate(binop)*
    *ENDIF*
    *RETURN rank*

FIG. 19

*AlgebraicReassociationTransform(BlockDiagram BD)*

*For each node n in N(BD)*

*if the node n is a structure then:*

*call AlgebraicReassociationTransform(n)*

*else IsBinOp(n) AND IsOpReassociable(n)*

*Sweep through the block diagram BD along all possible upstream paths starting from the binop n and along all possible downstream paths starting from binop n in order to collect all reassociable binops along those paths. A path terminates if there is no next node along the path or the next node is not a reassociable binop. "Downstream" means "in the direction of dataflow" in the block diagram. "Upstream" means "against the direction of dataflow" in the block diagram.*

*Mark all the reassociable binops that are collected in the sweep.*

*Consider only the node that is most downstream among those marked in the sweep; add such a node to a list of nodes where algebraic reassociation is to begin*

*endif*

*For every node in the list of nodes gathered where reassociation is to begin*

*call DoReassociation(binop)*

FIG. 20

Associate (BinOp A, BinOp B) : Rank

Swap( y(B), x(B) )
    Swap( y(A), x(A) )
    Swap( y(A), x(B) )
    RunTypeProp(B)
    RunTypeProp(A)
    RETURN Reassociate(A)

FIG. 21

Rank (Terminal x) : Rank

// gives the rank vector of the input x rank  <KVARIANT, array, KLargestDataType>
    // Default to the vector of lowest possible compound rank IF the value(x) is compile-time constant THEN
      rank.v  KNONVARIANT
      rank.d  KScalar if scalar else KArray if array
      rank.s  GetDataSizeRank(x)  // GetDataSizeRank returns the size of
                                                      // the generic element of the operand x
    ELSEIF value(x) is a loop-invariant THEN
      // calculated based on depth of loop-invariance
      rank.v  kloopInvariance(depth)
      rank.d  KScalar if scalar else KArray if array
      rank.s  GetDataSizeRank(x)
    ELSEIF IsOpReassociable( source(x) ) THEN
      rank  DoReassociation(source(x) )
    ENDIF RETURN rank

FIG. 22

*Reassociate (binop) : Rank*

```
// Apply commutative rule first to order inputs such that
// rank( x input ) < rank ( y input ).
// If the input pair is ( constant, variant ), the x input will be constant and
//  y input will be variant on applying the rule of commutativity.
// If they are of the same invariance rank, the inputs will be ordered on
// the basis of the dimension rank.
// If they are of the same dimension rank as well,
// the inputs will be ordered based on the data-size rank.
xInputRank  Rank(xInput)
rank  yInputRank  Rank(yInput)
// Commutativity
IF xInputRank > yInputRank THEN //swap inputs by law of commutativity
        Call Commutate( binOp ) // note: for subtraction, we do the
        special swap only if the subtrahend is a constant operand.
        IF binop is subtraction THEN
          RETURN xInputRank
        ELSE
          rank  xInputRank
          swap(xInputRank, yInputRank)
        ENDIF
// Associativity
ELSEIF binop is subtraction THEN
    RETURN xInputRank as subtraction is not associative
ENDIF
// Applying rules of associativity
IF
        yInputSourceBinop = yInput's source binop exists
        // there is a binop feeding the y input terminal
        AND !IntermediateResultNecessary(yInputSouceBinop)
        // the intermediate result produced by this binop is used as
        // an input only once
        AND yInputSourceBinop is same kind of operation as binop
        // this binop of a similar kind
              rank = Associate(binop, yInputSourceBinop)

RETURN rank
```

FIG. 23 scan program code to identify an algebraic expression specified by the program code, where the algebraic expression includes two or more mutually-compatible binary operations and three or more operands, where the three or more operands include two or more scalar operands and one or more array operands
2610 operate on the algebraic expression to obtain a final expression, where the action of operating on the algebraic expression involves performing transformations on selected subexpressions of the algebraic expression, where the transformations include one or more commute transformations and one or more associate transformations, where the final expression specifies an order of execution for the two or more binary operations such that the two or more scalar operands are combined before the one or more array operands are combined in the final expression
2615

FIG. 26 scan program code to identify an algebraic expression specified by the program code, where the algebraic expression includes two or more mutually-compatible binary operations and three or more operands, where the three or more operands include two or more scalar operands and one or more array operands
2710 operate on the algebraic expression to obtain a final expression, where the action of operating on the algebraic expression includes computing a rank vector for each of the three or more operands, where the rank vector for any given one of the three or more operands includes a first component that is based on an invariance rank of the operand and a second component that is based on a dimension of the operand, where the action of operating on the algebraic expression to obtain the final expression also includes performing transformations on selected subexpressions of the algebraic expression, where the transformations include one or more commute transformations and one or more associate transformations, where each of the commute transformations exchanges the input operands of a corresponding one of the two or more binary operations to order the input operands according to an ordering of possible states of the rank vector, where the ordering of possible states gives precedence to the first component over the second component
2715

*FIG. 27*

REARRANGEMENT OF ALGEBRAIC EXPRESSIONS BASED ON OPERAND RANKING SCHEMES

FIELD OF THE INVENTION

The present invention relates to the field of program code optimization, and more specifically, to systems and methods for optimizing the execution order of operations in algebraic expressions that occur in program code.

DESCRIPTION OF THE RELATED ART

Program languages allow a programmer to create mathematical expressions involving a variety of operators and operand types. Sometimes the expressions specified by a programmer are far from optimal when viewed in terms of execution efficiency and/or memory usage. For example, given an integer array A and integer scalars $s_1$, $s_2$ and $s_3$, the expression $((A+s_1)+s_2)+s_3$, is very inefficient compared to the alternative expression $A+(s_1+(s_2+s_3))$. The former expression includes three array-scalar additions whereas the alternative expression includes two scalar-scalar additions and only one array-scalar addition. As another example, the expression $([u64]+[u16])+[u16]$ is inefficient compared to the alternative expression $[u64]+([u16]+[u16])$, where the notation $[uN]$ denotes an array of N-bit unsigned integers. The former expression involves two additions of the form $[u64]+[u16]$. However, the alternative expression involves only one addition of the form $[u64]+[u16]$, the second addition being of the form $[u16]+[u16]$. Thus, the alternative expression is more efficient in its use of memory. There exists a fundamental need for mechanisms capable of transforming expressions appearing in program code to expressions that are more computationally efficient and/or memory efficient.

SUMMARY

In some embodiments, a computer-implemented method for operating a compiler to rearrange expressions appearing in program code may involve the following operations.

The method may involve scanning program code to identify an algebraic expression specified by the program code. The algebraic expression includes two or more mutually-compatible binary operations and three or more operands, where the three or more operands include two or more scalar operands and one or more array operands. To say that the binary operations are mutually compatible means that they each obey the commutative and associative laws and that any two of them are mutually associative. Two operations, $\oplus$ and $\otimes$, are said to be mutually associative if $(u \oplus v) \otimes w = u \oplus (v \otimes w)$ and $(u \otimes v) \oplus w = u \otimes (v \oplus w),$ where operands u, v and w are types (data size, signed-ness, dimensionality) for which the operations are defined. It is noted that the above definition of mutual compatibility includes within its scope of meaning the possibility that all the operations in a given expression might be instances of a single operator (such as "addition" or "multiplication" or "Boolean AND", etc.). In some of the embodiments described herein, a compiler may be configured to restrict its attention to such expressions.

The method may also involve operating on the algebraic expression to obtain a final expression. The action of operating on the algebraic expression involves performing transformations on selected subexpressions of the algebraic expression, where the transformations include one or more commute transformations and one or more associate transformations. The final expression specifies an order of execution for the binary operations such that the two or more scalar operands are combined before the one or more array operands are combined in the final expression.

Each of the commute transformations acts to commute the first input and the second input of a corresponding one of the two or more binary operations in response to a determination that the first input of the corresponding binary operation is of scalar type and the second input of the corresponding binary operation is of array type.

The action of operating on the algebraic expression to obtain the final expression may include: (a) determining if a given operation $Op_1$ of the two or more binary operations satisfies a reassociation condition, where the reassociation condition is the condition that the first input of the operation $Op_1$ corresponds to the output of another operation $Op_2$ of the two or more binary operations, that the first input of the operation $Op_2$ is an array, that the second input of the operation $Op_2$ is a scalar $s_1$, and that the second input of the operation $Op_1$ is a scalar $s_2$; and (b) performing an associate transformation on the operations $Op_1$ and $Op_2$ in response to determining that the operation $Op_1$ satisfies the reassociation condition. According to one embodiment, after the associate transformation is performed, the first and second inputs of the operation $Op_2$ are respectively the scalar $s_1$ and the scalar $s_2$, the first input of the operation $Op_1$ is the array, and the second input of the operation $Op_1$ is the output of the operation $Op_2$. Furthermore, after performing the associate transformation, type propagation may be performed on the operations $Op_1$ and $Op_2$.

In one embodiment, the method may also involve generating modified program code that includes the final expression, e.g., by replacing the algebraic expression in the original program code (or a copy of the original program code) with the final expression. The modified program code may be displayed via a display device. Thus, the user is able to see how the algebraic expression has been rearranged.

In another embodiment, a computer-implemented method for operating a compiler to rearrange expressions appearing in program code may involve the following operations.

The method may involve scanning program code to identify an algebraic expression specified by the program code. The algebraic expression includes two or more mutually-compatible binary operations and three or more operands, where the three or more operands include two or more scalar operands and one or more array operands.

The method may also involve operating on the algebraic expression to obtain a final expression. The action of operating on the algebraic expression may include computing a rank vector for each of the three or more operands, where the rank vector for any given one of the three or more operands includes a first component that is based on an invariance rank of the operand and a second component that is based on the dimension of the operand. (The invariance rank of an operand is assigned based on its position in the following ordered progression: constant, . . . , loop invariant of depth 3, loop invariant of depth 2, loop invariant of depth 1, variant. Thus, constants have the highest rank while variants have the lowest rank.) (The dimensional rank of an operand is based on the number of elements in the operand. The smaller the number of elements, the higher the dimensional rank. Thus, a scalar operand has higher rank than an array of n>1 elements, which has higher rank than a 2D array and so on.) The action of operating on the algebraic expression to obtain the final expression may also include performing transformations on selected subexpressions of the algebraic expression, where the transformations include one or more commute transformations and one or more associate transformations. Each of the commute transformations exchanges the input operands of a corresponding one of the two or more binary operations to order the input operands according to an ordering of possible states of the rank vector. The ordering of possible states gives precedence to the first component over the second component. Because the ordering of possible states gives precedence to the invariance rank over the dimensional rank, the operands of the final expression are combined in order of their invariance rank, and among operands of the same invariance rank, in order of their dimension (i.e., scalars before arrays).

After performing the commute transformation on a given one of the two or more binary operations, the given binary operation may be examined to determine if it satisfies a reassociate condition. The reassociate condition may be a logical AND combination of two or more subconditions. The two or more subconditions may include: a first subcondition that the first input of the given binary operation is the output of a second one of the two or more binary operations; and a second subcondition that the output of the second binary operation is not used as an input in the program code other than as the first input of the given binary operation. In some embodiments, the two or more subconditions may include a third subcondition, where the third subcondition is the Boolean result of a test to determine if the second binary operation is of the same (or similar) kind as the given binary operation. For example, if the given binary operation is addition, the second binary operation should be mutually-compatible with addition.

An associate transformation may be performed on the given binary operation and the second binary operation in response to determining that the given binary operation satisfies the reassociate condition.

In some embodiments, type propagation may be performed on the given binary operation and the second binary operation after the action of performing the associate transformation on the given binary operation and the second binary operation.

In some embodiments, the rank vector for any given one of the three or more operands also includes a third component that is based on a data size associated with a generic element of the given operand, where the ordering of possible states of the rank vector gives precedence to the second component over the third component. (The generic element of a scalar is the scalar itself. The generic element of an array is any element of the array.) Because the order of execution specified by the final expression agrees with the ordering of possible states of the rank vector, the three or more operands are combined in the order of their invariance rank; among operands of the same invariance rank, the operands are combined in the order of their dimensional rank; among operands of the same invariance rank and same dimensional rank, the operands are combined in the order of their data-size rank (i.e., smaller size operands before larger size operands).

In some embodiments, the algebraic expression being operated on specifies an initial order of execution of the two or more binary operations. The action of operating on the algebraic expression may include operating on the two or more binary operations in a recursive fashion, starting with a particular one of the two or more binary operations that is last according to the initial order of execution.

In some embodiments, modified program code may be generated, e.g., by replacing the algebraic expression in the original program code with the final expression. The modified program code may be displayed via a display device. Furthermore, executable code may be generated from the modified program code, where the executable code includes a portion that corresponds to the final expression. That portion of the executable code respects the order of execution specified by the final expression.

BRIEF DESCRIPTION OF THE DRAWINGS

A better understanding of the present invention can be obtained when the following detailed description of the preferred embodiments is considered in conjunction with the following drawings.

FIG. 1A shows an example of program code that might be specified by a user.

FIG. 1B shows modified version of the program code where the original expression for operand W has been replaced by a modified expression obtained as the result of an algebraic rearrangement of the original expression.

FIG. 1C shows the result of applying constant folding and code motions transforms to the modified program code of FIG. 1B.

FIG. 2 shows one embodiment of a function that determines if type coercion is happening on a given binary operation.

FIG. 3 shows one embodiment of a function that determines if a given binary operation is a reassociable operator.

FIG. 4 shows one embodiment of a function that determines whether the binary operation that produces operand t as its output is commutative and associative with respect to the type of operand t.

FIG. 5 presents one embodiment of a function that rearranges an algebraic expression so that the resulting expression is partitioned into a constant part, a loop invariant part and a variant part.

FIG. 6 presents one embodiment of a function that determines the invariance rank associated with the output terminal (i.e., the result) of a given binary operation.

FIG. 7 presents one embodiment of a function Rank, which determines the invariance rank of a given terminal x.

FIG. 8 presents one embodiment of a function that reassociates the operands of a given pair of binary operations.

FIG. 9 presents one embodiment of a function that commutes the two input operands of a given binary operation.

FIG. 10 presents one embodiment of a function that takes a given binary operation as argument and returns the invariance rank of the given binary operation. Also, this function performs a commute transformation under a first condition and an associate transformation under a second condition.

FIG. 13 shows a modified version of the Associate function that supports type propagation.

FIG. 14 shows a modified version of the Reassociate function that is configured to support type propagation.

FIG. 16 presents for one embodiment of a function that operates on a given binary operation, and returns a Boolean that indicates whether or not a commute operation should be performed on the binary operation.

FIG. 17 presents one embodiment of the function Reassociate that is configured to support scalar-versus-array rearrangement in addition to constant/loop-invariant/variant rearrangement of expressions.

FIG. 19 shows one embodiment of the DoReassociation function that is configured to support a three-level prioritized ranking scheme: (invariance rank, dimension rank, data-size rank).

FIG. 20 shows one embodiment of the AlgebraicReassociationTransform function that is configured to support the three-level prioritized ranking scheme.

FIG. 21 shows one embodiment of the Associate function that is configured to support the three-level prioritized ranking scheme.

FIG. 22 shows one embodiment of the Rank function that is configured to support the three-level prioritized ranking scheme.

FIG. 23 shows one embodiment of the Reassociate function this is configured to support the three-level prioritized ranking scheme.

FIG. 26 illustrates one embodiment of a method for operating a compiler to rearrange expressions so that the rearranged expression combines scalars before combining arrays.

FIG. 27 illustrates one embodiment of a method for rearranging algebraic expression based on a prioritized ranking scheme.

Figure 11:
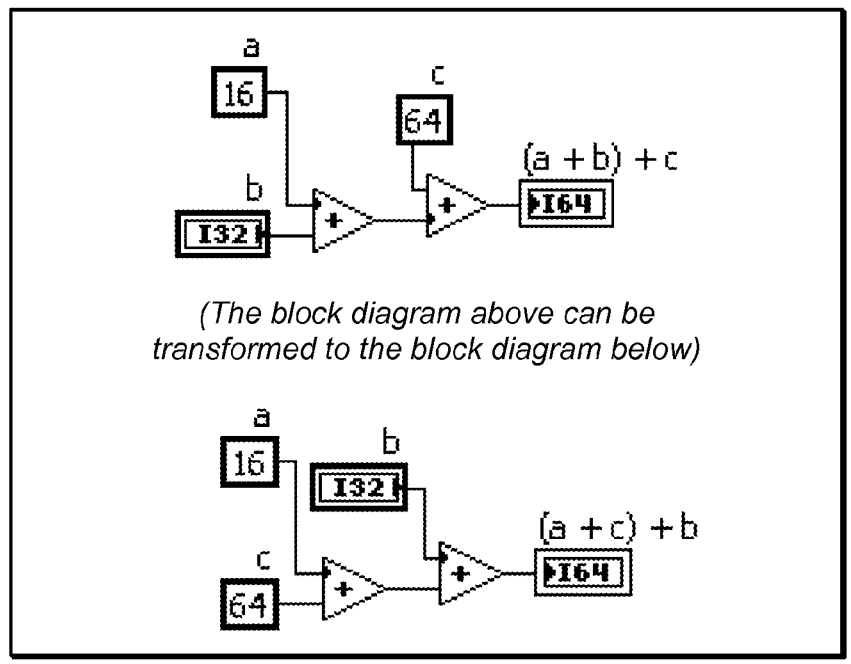
FIG. 11 shows LabVIEW block diagrams corresponding respectively to the expression ((a+b)+c) and the transformed expression (b+(a+c)).

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

The following is a glossary of terms used in the present document.

Memory Medium—A memory medium is a medium configured for the storage and retrieval of information. Examples of memory media include: various kinds of semiconductor memory such as RAM and ROM; various kinds of magnetic media such as magnetic disk, tape, strip, film, etc.; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

Programmable Hardware Element—a hardware device that includes multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. As used herein, the term "program" includes within its scope of meaning: 1) a software program which is stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Software Program—the term "software program" is intended to have the full breadth of its ordinary meaning, and includes any type of program instructions, code, script and/or data, or combinations thereof, that may be stored in a memory medium and executed by a processor or computer system. Exemplary software programs include: programs written in text-based programming languages such as C, C++, Java™, Pascal, Fortran, Perl, etc.; graphical programs (programs written in graphical programming languages); assembly language programs; programs that have been compiled to machine language; scripts; and other types of executable software. A software program may comprise two or more subprograms that interoperate in a specified manner.

Hardware Configuration Program—a program, e.g., a netlist or bit file, that can be used to program or configure a programmable hardware element.

Graphical Program—A program comprising a plurality of interconnected nodes or icons, where the plurality of interconnected nodes or icons visually indicate the functionality of the program. A graphical program is a type of diagram.

The following provides examples of various aspects of graphical programs. The following examples and discussion are not intended to limit the above definition of graphical program, but rather provide examples of what the term "graphical program" encompasses.

The nodes in a graphical program may be connected in one or more of a data flow, control flow, and/or, execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, where the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program. The graphical program may be configured to perform any of the method embodiments described herein, or any combination of method embodiments described herein, or any subset of any of the method embodiments described herein, or any combination of such subsets.

Input data to a graphical program may be received from any of various sources, such as a receiver (e.g., an RF receiver) or a receiver front end, a signal processing board, a modem, a network interface (e.g., a wireless network interface), a unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, where the connections between the nodes indicate that data produced by one node is used by another node.

Node—In the context of a graphical program, an element that may be included in a graphical program. A node may have an associated icon that represents the node in the graphical program, as well as underlying code and/or data that implements functionality of the node. Exemplary nodes include function nodes, sub-program nodes (sub-VIs), terminal nodes, structure nodes, etc. Nodes may be connected together in a graphical program by connection icons or wires.

Graphical User Interface—this term is intended to have the full breadth of its ordinary meaning The term "Graphical User Interface" is often abbreviated to "GUI". A GUI may include one or more input GUI elements, one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses.

A GUI may comprise a single window having one or more GUI Elements, or may comprise more than one window, each having one or more GUI Elements.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and that enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input, and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. Exemplary input controls comprise dials, knobs, sliders, switches, text input boxes, numeric input fields, etc.

Output Indicator—a graphical user interface element for displaying output from a program. Exemplary output indicators include charts, graphs, gauges, text output boxes, numeric displays, etc. An output indicator is sometimes referred to as an "output control".

Computer System—any of various types of computing or processing systems, including a personal computer (PC), a mainframe computer system, a workstation, a laptop, a tablet computer, a network appliance, an Internet appliance, a handheld or mobile device, a personal digital assistant (PDA), a television system, a grid computing system, or other device or combinations of devices. In general, the term "computer system" can be broadly defined to encompass any device (or combination of devices) having at least one processor that is configured to execute instructions that are stored on a memory medium.

Measurement Device—includes instruments, data acquisition devices, smart sensors and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card, a video capture board, a smart camera, a motion control device, a robot having machine vision, and other similar types of devices. Exemplary "stand-alone" instruments include oscilloscopes, multimeters, signal analyzers, signal demodulators, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, e.g., may receive and analyze data, and issue automation control signals in response.

The various embodiments disclosed herein may be realized in any of various forms. For example, any of the embodiments disclosed herein may be realized as a computer-implemented method, a computer-readable memory medium, or a computer system. Furthermore, any of the embodiments disclosed herein may be realized in terms of one or more custom-designed hardware devices such as ASICs, or, one or more appropriately-configured programmable hardware elements (PHEs).

A computer-readable memory medium is a memory medium that stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may include a processor (or a set of processors) and a memory medium. The memory medium stores program instructions. The processor is configured to read and execute the program instructions from the memory medium. The program instructions are executable by the processor to implement a method, e.g., any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a tablet computer, a wearable computer, a computer integrated in a head-mounted display, etc.

In some embodiments, a set of computers distributed across a computer network may be configured to partition the effort of executing a computational method (e.g., any of the method embodiments disclosed herein).

This patent application describes various embodiments of methods for rearranging algebraic expressions that occur in program code. In some embodiments, the goal of the rearrangement may be to achieve a modified expression that will execute more efficiently and/or execute using less memory. In some embodiments, the goal of the rearrangement may be to achieve a modified expression that exposes opportunities for applying constant folding to constants and code motions to loop invariants. In some embodiments, the modified expression is required to give the same mathematical result as the original algebraic expression. In some embodiments, a compiler is designed to perform the rearrangement process.

An algebraic expression may be rearranged based on a scheme for ranking of the operands in the algebraic expression. For example, given an expression such as $d+((b+a)+c)$ with $\text{rank}(a) > \text{rank}(b) > \text{rank}(c) > \text{rank}(d)$, it may be desirable to rearrange the expression so that the operands are combined in the order of their rank. Thus, the given expression might be rearranged to form the modified expression $a+(b+(c+d))$, where the operands of highest rank, d and c, are combined first, then operand b is combined, and finally the lowest rank operand a is combined. (This example and many of the examples given herein follow the convention that high rank corresponds to low value of the rank( ) function. Thus, rank(u)<rank(v) means that the rank of operand u is higher than the rank of operand v. However, the opposite convention could just as well have been adopted, i.e., the convention that high rank corresponds to high value of the rank( ) function.) The rearrangement process might involve a number of transformations based on the commutative and associative laws for the combining operator (the "+" operator in this case). For example, the given expression may be rearranged based on a series of transformations such as the following:

| | |
|---|---|
| Commute:$d+((b+a)+c) \rightarrow d+((a+b)+c)$ | 1. |
| Associate:$d+((a+b)+c) \rightarrow d+(a+(b+c))$ | 2. |
| Commute:$d+(a+(b+c)) \rightarrow (a+(b+c))+d$ | 3. |
| Associate:$(a+(b+c))+d \rightarrow a+((b+c)+d)$ | 4. |
| Associate:$a+((b+c)+d) \rightarrow a+(b+(c+d))$ | 5. |

The transformations proceed bottom-up when viewed relative to the expression tree of the expression. (An expression may be identified with an expression tree whose nodes are the operations in the expression and whose leaf nodes are the primitive operands—a, b, c and d in the example above. The expression tree represents the way that operands are combined by the operations.) Notice that the first commute operation is related to a and b, which are initially at the lowest level of the expression tree.

As another example of how the rearrangement might work, the given expression might be rearranged based on this alternative series of transformations:

| | |
|---|---|
| Commute:$d+((b+a)+c) \rightarrow ((b+a)+c)+d$ | 1. |
| Associate:$((b+a)+c)+d(b+a)+(c+d)$ | 2. |
| Commute:$(b+a)+(c+d) \rightarrow (a+b)+(c+d)$ | 3. |
| Associate:$(a+b)+(c+d) \rightarrow a+(b+(c+d))$. | 4. |

Thus, there are different ways to achieve the arrangement of an expression based on commutative and associated transformations.

While the rearrangement examples given above are based on an expression involving the addition operator, rearrangement may be performed on expressions involving other operators as well. For example, the expression $d*((b*a)*c)$ involving the multiplication operator "*" may undergo the same or similar rearrangement as described above. Any expression that involves a non-empty subset of operators that are mutually compatible is a candidate for rearrangement.

As noted above, the rearrangement of an expression may involve a number of transformations including possibly one or more commute transformations and/or one or more associate transformations. Each commute transformation on a binary operator O is a transformation of the form $uOv \rightarrow vOu$.

Each associate transformation is a transformation of the form $(uOv)Ow \rightarrow uO(vOw)$, or perhaps of the alternative form:

$uO(vOw) \rightarrow (uOv)Ow$.

As noted above, an algebraic expression may be rearranged based on a scheme for ranking of the operands in the algebraic expression. There are a wide variety of ways to rank the operands. In one embodiment, the operands may be ranked based on their level of invariance in the program code. This type of ranking is referred to herein as "invariance ranking". In a second embodiment, the operands may be ranked based on operand dimension. In a third embodiment, the operands may be ranked based on data size. In a fourth embodiment, the operands may be ranked based on a combination of invariance rank and dimensional rank, where invariance rank takes precedence over dimensional rank. To say that invariance rank takes precedence over dimensional rank means that the composite rank of operand u is higher than the composite rank of operand v if and only if (a) the invariance rank of u is higher than the invariance rank of v, or (b) the invariance rank of u is equal to the invariance rank of v, and the dimensional rank of u is higher than the dimensional rank of v. In a fifth embodiment, the operands may be ranked based on a combination of invariance rank, dimensional rank and data-size rank, where invariance rank takes precedence over dimensional rank, and dimensional rank takes precedence over data-size rank.

Invariance Ranking

According to the invariance-rank embodiment, the operands of an expression are ranked based on their level of invariance in the program code. Constant operands may be assigned the highest rank (i.e., the lowest numeric rank value). Then each loop invariant may be assigned a lower rank based on its depth of loop invariance. For example, suppose the program code under analysis includes two nested loops. Given an algebraic expression within the inner one of the two loops, it is possible that a first operand of that expression may be invariant with respect to the inner loop only, while a second operand of that expression may be invariant with respect to the inner and outer loops. (To say that an operand is invariant with respect to a given loop means that the operand does not change throughout the iterations of the loop.) Thus, the second operand would be assigned a higher rank (i.e., lower numeric rank value) than the first operand, reflecting the understanding that there is more benefit in computational efficiency to be gained by motioning computations out of both loops than by motioning computations out of the inner loop only. Furthermore, each loop variant (i.e., each operand that varies with different iterations of the innermost loop in which the expression occurs) is assigned the lowest rank.

When an expression is rearranged based on the above-described invariance rank, the rearranged expression will specify an order for combining the operands so that constants are combined first, followed by loop invariants according to their respective depths of loop invariance, and then followed by the loop variants. For example, given the expression $$(((ca+vb)+(Lc+vd))+(L_{2e+cf})+Lg,$$

where ca is a constant, vb is a loop variant, Lc is loop invariant of depth one, vd is a loop variant, $L^2e$ is a loop invariant of depth two, cf is a constant, and Lg is a loop invariant of depth one, the rearrangement based on invariance rank might produce the expression:

$$vb+(vd+(Lc+(Lg+(L_{2e+(ca+cf)})))).$$

After the rearrangement, the compiler may apply constant folding to the constant operands and perform code motion to the loop invariant operands.

For an illustration of the above original expression as it might occur in program code, see FIG. 1A.

After performing expression rearrangement, the program code may be updated by replacing the original expression with the rearranged expression, as shown in FIG. 1B.

In some embodiments, the compiler may operate on the updated program code by performing constant folding on the constant subexpression (ca+cf) of the rearranged expression, and by performing code motion on the loop invariant subexpressions of the rearranged expression, e.g., as shown in FIG. 1C. Observe that the constant subexpression ca+cf is replaced by a single constant c of equal value; the computation of loop invariants Lc and Lg are moved outside the inner loop; and the computation of loop invariant $L_2e$ is moved outside both loops.

Dimensional Ranking

Many programming languages allow one to specify an expression involving a binary operation on two arrays (e.g., two arrays of the same array size), where the operation is meant to be applied element-wise, i.e., each element of the first array operand is to be combined with the corresponding element of the second array operand to form a corresponding element of a resultant array. For example, the addition or subtraction or multiplication of two arrays may be interpreted element-wise. Other examples include the logical AND or the logical OR acting on two Boolean arrays. Any binary operator on two scalars may be extended to a binary operator on two arrays based on the principle of element-wise combination. If the binary operator on scalars is both commutative and associative, the element-wise extension to arrays will be too.

In addition to binary operations on arrays, some programming languages allow one to specify an expression that combines a scalar and an array with a binary operator, with the implied meaning that the scalar is to be combined with each element of the array to form a corresponding element of a resultant array. (For example, 2+[2,3,4]=[4,5,6]. As another example, 2*[2,3,4]=[4,6,8].) Again, any commutative and associative binary operator on scalars extends to a commutative and associative binary operator on mixed operands (i.e., one scalar operand and one array operand) based on the principle of element-wise combination.

Given a programming language that allows one to specify expressions that include binary operations on array operands and binary operations on mixed operands, it becomes possible for the programmer to specify compound expressions that are not well conceived in terms of execution efficiency. For example, the user might specify the expression $(A+s_1)+s_2$, where A is an array, and $s_1$ and $s_2$ are scalars. (To distinguish scalar operands from array operands, scalar operands will be represented with lower case letters while array operands will be represented with capital letters.) This expression involves two mixed array-scalar additions. One of those mixed additions could be replaced by a scalar-scalar addition if the compiler were appropriately designed (as herein disclosed) to rearrange the expression to obtain the modified expression $A+(s_1+s_2)$ based on an application of the associative law. The addition $s_1+s_2$ can be executed more quickly than the addition of a scalar and an array. The amount of computational savings that follows from the rearrangement depends on the size of the array (i.e., the number of elements in the array). As another example, given the expression $(s_1+A_1)+(A_2+s_2)$, wherein $s_1$ and $s_2$ are scalars and $A_1$ and $A_2$ are arrays, the compiler might rearrange the expression to form one of the following modified expressions:

$$A_1+(A_2+(s_1+s_2))$$

$$A_1+(A_2+(s_2+s_1))$$

$$A_2+(A_1+(s_1+s_2))$$

$$A_2+(A_1+(s_2+s_1)),$$

with the key ingredient of each modified expression being the fact that the scalars are combined together before the arrays are combined. Thus, each modified expression is more efficiently executable because it has a scalar-scalar addition where the original addition had no scalar-scalar additions. (The original expression had two mixed scalar-array additions and one array-array addition.)

As another example, suppose that the user specifies the expression $$(((A+s_1)+s_2)+s_3$$

as part of the program code. In this case, the compiler might rearrange the expression to obtain the following modified expression:

$$A+(s_1+(s_2+s_3))),$$

where the scalars are combined before the array is allowed to be combined. Thus, the modified expression includes three scalar-scalar additions and only one scalar-array addition whereas the original expression included four scalar-array additions. Therefore, the modified expression will execute much more quickly than the original expression.

The rearrangement process might involve a series of transformations including one or more commute transformations and/or one or more associate transformations. For example, the following series of transformations might be used to produce the second of the four modified expressions listed above:

$$\text{Commute}: (s_1+A_1)+(A_2+s_2) \rightarrow (A_1+s_1)+(A_2+s_2)$$

$$\text{Associate}: (A_1+s_1)+(A_2+s_2) \rightarrow A_1+(s_1+(A_2+s_2))$$

$$\text{Commute}: A_1+(s_1+(A_2+s_2)) \rightarrow A_1+((A_2+s_2)+s_1)$$

$$\text{Associate}: A_1+((A_2+s_2)+s_1) \rightarrow A_1+(A_2+(s_2+s_1)).$$

To perform such rearrangements, the compiler may use a dimensional ranking scheme, to rank the operands of any given expression. According to the dimensional ranking scheme, scalars are ranked higher than arrays. Thus, the compiler rearranges the given expression using commute transformations and associate transformations in order to specify a modified expression where the high rank operands (i.e., the scalars) are combined before the low rank operands (i.e., the array operands).

Data Size Ranking

As noted above, in some embodiments, the compiler may rank operands based on data size. When an expression in the program code involves operands having different data sizes, it may be desirable to rearrange the expression so that smaller size operands are combined before the larger size operands. For example, given an expression such as (u64+u32)+u16, where the notation "uN" represents an unsigned integer of N bits length, the compiler might rearrange the expression to form the modified expression u64+(u32+u16). Thus, the modified expression has an intermediate result that is u32 where the original expression had an intermediate result that was u64. (The sum of a uM operand and a uN operand is a uK operand, where K=max{M,N}.) Thus, the execution of the modified expression would consume less space (in memory, on disk, or in the register space of the processor). Such rearrangements may be particularly beneficial when the expression includes one or more array operands. For example, given an expression such as ([u64]+[u32])+[u16], where the notation "[uN]" denotes an array whose elements are of type uN, the compiler might rearrange the expression to form the modified expression [u64]+([u32]+[u16]). Thus, the modified expression has an intermediate result that is an array of u32 elements where the original expression had an intermediate result that was an array of u64 elements. Thus, the execution of the modified expression would involve L*32 bits less storage space, where L is the number of elements in the array.

As another example, suppose that the program code includes the following expression:

$$((((int16*[int32])*int64)*[int16])*int32)*[int64],$$

where the notation "intN" represents a signed integer operand of N bits length, and the notation "[intN]" represents an array whose elements are signed integers of N bits length. Given this expression, the compiler may rearrange the expression according to data size to obtain the modified expression $$int64*([int64]*([int32]*(int32*(int16*[int16])))).$$

Thus, in the modified expression, the operands are combined in the order of their data size.

While the above examples use the addition operator and the multiplication operator, the compiler may be configured to perform rearrangement based on data size for any expression that includes two or more mutually compatible operators as defined above.

To support the rearrangement of expressions according to data size, the compiler may assign a rank to each operand in an expression based on the data size of the operand. An operand with smaller data size is assigned higher rank than an operand with larger data size. The data size of an operand is the number of bits allocated to a generic element of the operand. Thus, the data size of a scalar operand is the number of bits allocated to the scalar operand. (The scalar operand may be thought of as an array having a single element.) Furthermore, the data size of an array operand is the number bits allocated for the generic element of the array operand. Consequently, an array of u32 values would have the same data size and same rank as a u32 scalar. However, an array of u32 values would have smaller data size and higher rank than a u64 scalar.

Type Propagation

In the process of rearranging an expression, the operands associated with a given operator of the expression may change. When such a change occurs, the compiler may update the type of the result (i.e., the output operand) produced by the operator. For example, in the transformation $$(u64+u32)+u16 \to u64+(u32+u16),$$

the input operands of the right addition operator change from (u64,u16) to (u32,u16). Thus, the compiler may change the type of the output operand of the right addition operator from u64 to u32. As another example, in the transformation $$(int64+[u32])+u16 [u32]+(int64+u16),$$

the input operands of the right operator change from ([int64], u16) to (int64,u16). Thus, the compiler may change the output type of the right operator from [int64] to int64.

In some embodiments, the output type of an operator is: (a) signed if at least one of its input operands is signed; and (b) an array if at least one of its input operands is an array. Furthermore, the output type of an operator may be assigned a data size that is consistent with the maximum of the data sizes of the input operands of the operator.

The type of an operand indicates the dimensionality of the operand and the data size of the generic element of the operand. Thus, the type of a u32 array is different from the type of a u32 scalar. The type of an operand may also indicate whether or not the operand is signed, whether or not the operand is Boolean, etc.

In some embodiments, a compiler may be configured to perform any of the various rearrangements described herein on program code written in a text-based programming language. In other embodiments, a compiler may be configured to perform any of the various rearrangements described herein on program code written in a graphical programming language (such as LabVIEW).

In some embodiments, a compiler rearranges the operands of an algebraic expression in such a way that the final result remains the same while the sub-expressions of the expression are partitioned into constant, loop-invariant and variant parts. This rearrangement process is referred to herein as the CIV transform. (The descriptor "CIV" is meant to be suggestive of the constant/loop-invariant/variant partitioning.)(The CIV transform corresponds to the above-described process of rearranging expressions based on invariance rank.) The purpose of the CIV transform is to expose pieces of constant code that can be constant folded by a constant-folding optimization transform, and to expose loop-invariant code that can be moved out of a loop by a loop-invariant code-motion optimization transform.

The rules of commutativity and associativity are at the core of the CIV transform. However, the CIV transform may be extended to achieve rearrangements based on one or more criteria in addition to the CIV criterion (i.e., the level of invariance). Unlike the CIV transform, whose main role is to expose optimization opportunities for other optimization transforms (such as constant folding and loop-invariant code motion), an extended transform may be able to optimize an expression on it own and lead to considerable improvements in the runtime performance of the program unit that contains the expression.

Below, embodiments of the CIV transform and a number of extensions to the CIV transform will be discussed.

In some embodiments, the CIV transform may be designed to operate as part of a compiler, e.g., the G-Code compiler of LabVIEW. In one embodiment, the CIV transform may operate on program code expressed in the Data Flow Intermediate Representation (DFIR) of LabVIEW.

Definitions and Conventions

BlockDiagram: A graph G(N,W) that represents a computer program, where the graph has N vertices connected by W edges. Each of the N vertices is a Node, and each of the W edges is a Wire. In some embodiments, graph G(N,W) is a directed acyclic graph (DAG).

Node: An operator or a program structure that occurs within the computer program.

BinOp: A binary operator, i.e., an operator that has only two inputs. A BinOp's input terminals are named and denoted as y and x in that order. For example, in the expression p+q, p would be the y input and q would be the x input of the Binop="+". A BinOp's Output terminal is named z. Thus, the inputs of a Binop B are denoted y(B) and x(B), and the output of the Binop B is denoted z(B).

Reassociable Operators: Add, Multiply, AND, OR and XOR. More generally, any binary operation that supports associativity and commutativity may be counted as a reassociable operator.

Reassociable Operand Types: Integer, Boolean, array of integers, array of Booleans. Furthermore, in some embodiments, any operand type that supports the rules of associativity and commutativity such as bit-fields and array of bit-fields may be counted as being a reassociable operand type.

FIG. 2 presents pseudocode for one embodiment of a function IsCoercionHappeningOn, which determines whether coercion is happening on a given binop. Coercion is said to be happening on the binop if the types of its two input terminals (i.e., input operands) are different. The input types might be different by having different data size and/or by having different dimension and/or by having different signed-ness.

FIG. 3 presents pseudocode for one embodiment of a function IsOpReassociable, which determines whether a given BinOp is reassociable. The specific list of operators that are recognized as being reassociable may vary from one embodiment to the next. In some embodiments, the user may specify operators to be added to the list.

FIG. 4 presents pseudocode for one embodiment of a function IsTypeFeasibleForReassociation, which determines whether the binop that supplies a terminal t (i.e., that produces operand t as its output) is commutative and associative with respect to the type of terminal t. Note that a given operator may be commutative and associative with respect to one operand type while failing to be commutative or associative with respect to another operand type. For example, the multiplication operator is commutative and associative with respect to scalar integers, but not commutative with respect to n×n matrices, where n>1.

FIG. 5 presents pseudocode for one embodiment of a function AlgebraicReassociationTransform, which implements the CIV transform on a given block diagram. The notation N(BD) represents the set of nodes of the block diagram. The term "structure" is used in the sense of "program structure" such as a loop structure, an IF/THEN structure, a program block, etc.

FIG. 6 presents pseudocode for one embodiment of a function DoReassociation, which determines the invariance rank associated with the output terminal (i.e., the result) of a given binop. If the type of the output terminal of the binop is a reassociable type, then the invariance rank is determined by calling the Reassociate function with binop as its argument. The Reassociate function is to be described below.

FIG. 7 presents pseudocode for one embodiment of a function Rank, which determines the invariance rank of a given terminal x.

FIG. 8 presents pseudocode for one embodiment of a function Associate, which reassociates the operands of a given pair of binops A and B. In particular, the function Associate performs the transformation (p B q) A r→p A (q B r) based on the following sequence of operations:

$$\text{Swap}(y(B),x(B)):(pBq)Ar \to (qBp)Ar$$

$$\text{Swap}(y(A),x(A)):(qBp)Ar \to rA(qBp)$$

$$\text{Swap}(y(A),x(B)):rA(qBp) \to pA(qBr).$$

In one alternative embodiment of the function Associate, the same transformation may be achieved based on the following sequence of operations:

$$\text{Commute}[B]:(pBq)Ar \to (qBp)Ar$$

$$\text{Mutual Associate}[A,B]:(qBp)Ar \to qB(pAr)$$

$$\text{Commute}[A]:qB(pAr) \to qB(rAp)$$

$$\text{Mutual Associate}[A,B]:qB(rAp) \to (qBr)Ap$$

$$\text{Commute}[A]:(qBr)Ap \to pA(qBr)$$

FIG. 9 presents pseudocode for one embodiment of a function Commutate, which commutes the two input operands of a given binop.

FIG. 10 presents pseudocode for one embodiment of a function Reassociate, which takes a given binop A as argument, and returns the invariance rank of the binop A. The Reassociation function commutes the input operands of the binop A if the invariance rank of the x input of the binop is higher (has lower numeric value) than the invariance rank of the y input of the binop. For example, if the input operands of the binop A are of the form (constant, variant), the commute operation will be applied to transform the input pair to (variant, constant). After having performed the commute operation or having found that the commute operation is not necessary, the Reassociate function calls the Associate function if the binop satisfies a certain compound condition. In one embodiment, the compound condition is the condition that: (a) there exists a binop B whose output feeds the y input of the binop A, and (b) the output of binop B is consumed as an input only once in the program code, and (c) the binop B is of the same or similar kind as binop A, and (d) coercion is not happening on the binop B.

The CIV transform as described above in FIGS. 2-10 is referred to herein as the baseline CIV transform.

Extension of the CIV Transform to Incorporate Type Propagation

When the baseline CIV transform encounters a binop for which coercion is happening (i.e., a binop whose input operands are of different types), it bypasses any attempt to perform the commute transform or the associate transform with respect to that binop.

Scalar example: Consider the expression ((a+b)+c), where scalar a is of type u16, scalar b is of type u32, and scalar c of type u64. If a and c are constants and b is a variant, it would make sense to reassociate the expression as (b+(a+c)). However, this would mean that the type of the intermediate result would change from being u32 to u64. LabVIEW block diagrams corresponding respectively to the expression ((a+b)+c) and the transformed expression (b+(a+c)) are shown in FIG. 11.

Figure 12:
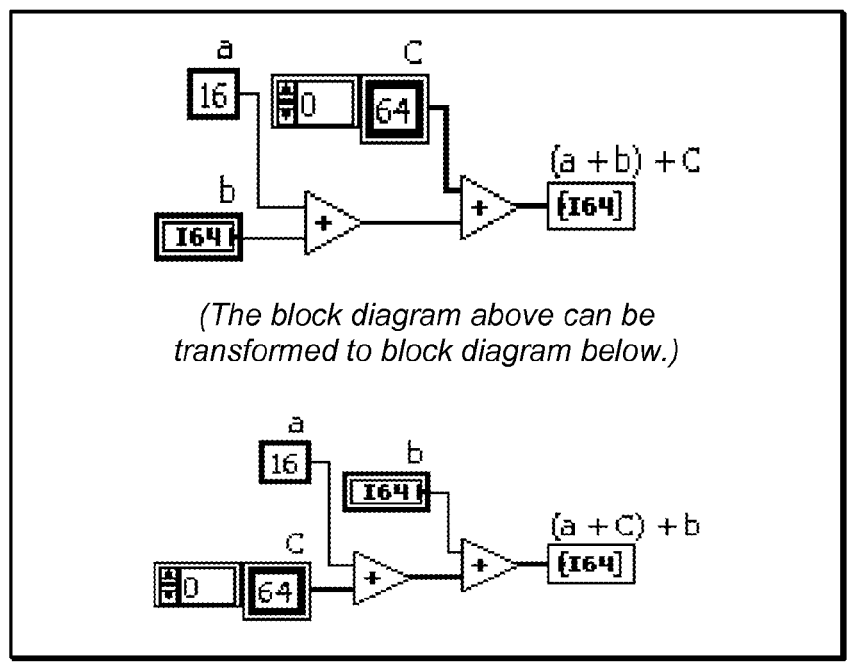
FIG. 12 shows LabVIEW block diagrams corresponding respectively to the expression ((a+b)+C) and the transformed expression (b+(a+C)).

Example involving both scalars and arrays: In some programming languages, some binary operations such as addition, multiplication, etc. can operate on arrays and scalars at the same time. The baseline CIV transform is designed to avoid rearrangement on an algebraic expression that has a mixture of scalar and array operands. Consider an expression ((a+b)+C) where a is of numeric scalar type, b is of numeric scalar type, and C is of numeric array type. If a and C are constants and b is a variant, then it would make sense to reassociate the expression as (b+(a+C)). However, this would also mean that the type of the intermediate result would change from being a numeric scalar to a numeric array. Such type changes are not supported by the baseline CIV transform. LabVIEW block diagrams corresponding respectively to the expression ((a+b)+C) and the transformed expression (b+(a+C)) are shown in FIG. 12.

In some embodiments, the baseline CIV transform is extended to separate out constant, loop-invariant and variant parts of an expression even though the expression may involve operands of different types. This extended version of the baseline CIV transform is referred to herein as the "TP extension". In order to implement the TP extension, type propagation is performed after every local reassociation. As a result, in the scalar example given above, after reassociation, the type of the intermediate result would be appropriately set. Likewise, in the mixed scalar-array example given above, the type of the intermediate result would be changed to numeric array type.

Type propagation is the process of updating the type of the output operand of a binop based on the types of the input operands of the binop.

The TP-extension of the CIV transform may be achieved by modifying the Associate function and the Reassociation function. FIG. 13 shows an appropriately modified version of the Associate function. FIG. 14 shows an appropriately modified version of the Reassociation function.

The modified Associate function shown in FIG. 13 performs a reassociation according to the pattern (p B q) Ar→p A (q B r), and then performs type propagation on each of the binops A and B.

The modified Reassociate function shown in FIG. 14 is similar to the baseline version of the Reassociate function (FIG. 10). However, the modified version omits the IF clause that is conditioned upon IsCoercionHappeningOn(binop) and also omits the test based on !IsCoercionHappeningOn(yInputSourceBinop in the compound condition that controls the Associate function call.

In some embodiments, the type propagation may be executed on an intermediate program representation, i.e., a program representation that is intermediate between user-specified program code and machine executable code. In one embodiment, the intermediate program representation is the DFIR of LabVIEW.

Scalar Vs. Array Rearrangement

Scalar operations are generally faster than similar array operations. For example, adding an integer to an integer is faster than adding an integer to an array of integers or adding two arrays of integers.

Consider the expression ((a+A)+b), where a and b are scalar variants and A is an array variant, with the operator+ representing an operation that is both associative and commutative. Since all the operands involved in this expression are variants, the CIV transform (baseline version or TP-extended version) would leave this expression as it is. However, it would be beneficial if the compiler were able to rearrange this expression to obtain the more optimized expression (A+(a+b)) since this rearrangement would lead to a single array operation—adding A and (a+b), as opposed to two array operations in ((a+A)+b)—first adding a and A, and then adding the result, which would be an array, to the scalar b. The same would be true if all of the operands—a, b and A were either loop-invariant operands or constant operands.

Figure 15:
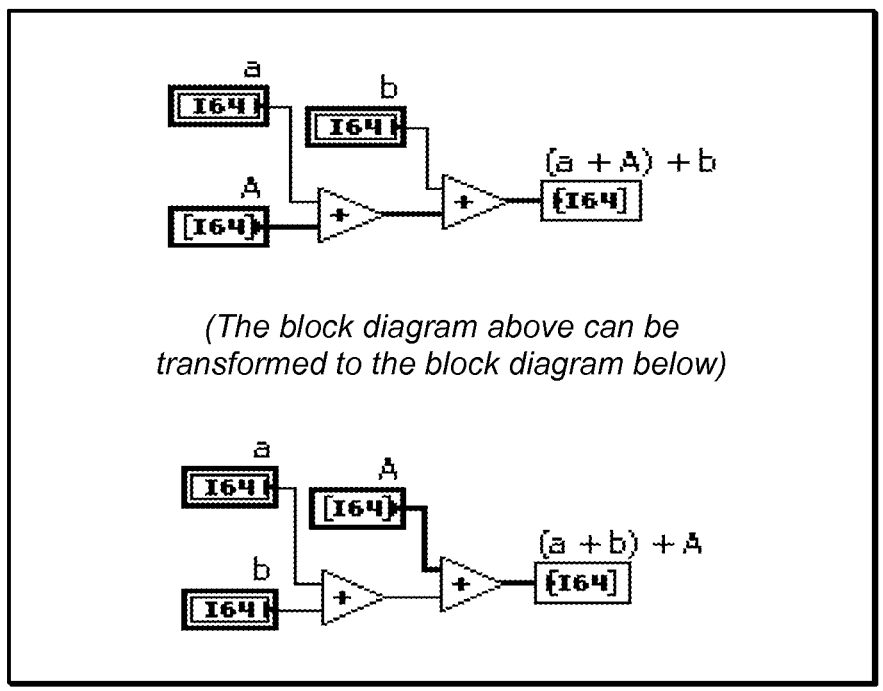
FIG. 15 shows LabVIEW diagrams corresponding respectively to the expression ((a+A)+b) and the optimized expression (A+(a+b)).

LabVIEW diagrams corresponding respectively to the expression ((a+A)+b) and the optimized expression (A+(a+b)) are shown in FIG. 15.

The idea behind scalar-versus-array rearrangement is that among scalar and array inputs of the same invariance rank (i.e., constants, or loop-invariants of the same depth, or variants), the scalar inputs are combined ahead of the array inputs. The combining operator should obey the rules of associativity and commutativity. A few similar optimization examples are listed below. Constant operands are prefixed with c, and loop invariant operands of the same depth of loop-invariance are prefixed with 1. An operand with no such prefix is a variant:

$$(ca+cA)+cb \rightarrow cA+(ca+cb)$$

$$(1a+1A)+1b \rightarrow 1A+(1a+1b)$$

$$(a+A)+b \rightarrow A+(a+b)$$

$$((((a+A)+b)+c)+d)+e \rightarrow A+(a+(b+(c+(d+e)))).$$

To enable the scalar-versus-array rearrangement, type propagation is performed after every local reassociation transform.

In one embodiment, the scalar-versus-array rearrangement depends on constant, loop-invariant, variant sub-expressions to have already been resolved. Thus, in this embodiment, the TP-extended CIV transform is scheduled ahead of the scalar-versus-array rearrangement.

Recall that, in the process of rearranging an expression based on invariance rank, operands are ranked such that constant operands are ranked ahead of loop-invariant operands, with loop-invariants of greater depth receiving the higher rank among loop-invariants. Variants receive the lowest rank. The result is that after this rearrangement, the constant operands get combined into the developing result ahead of the loop-invariants, and finally the variants are combined. This ranking scheme is referred to herein as the invariance ranking scheme.

In some embodiments, the TP-extended CIV transform is further extended to perform scalar-versus-array rearrangement as variously described above. This further extension of the TP-extended CIV transform is referred to herein as the CIV/SVA transform. The CIV/SVA transform uses a compound rank that is a combination of the invariance rank and a dimensional rank. According to the dimensional rank, scalars are ranked higher than constants. However, the compound rank gives precedence to the invariance rank over the dimensional rank. Thus, any constant operand ranks higher than any loop invariant operand, and any loop invariant operand ranks higher than any variant operand, regardless of dimensionality. Within a given invariance class, scalars rank higher than arrays. Thus, scalar constants rank higher than array constants; scalar loop-invariants of a given depth are ranked higher than array loop-invariants of the same depth; and scalar variants are ranked higher than array variants. The result of performing rearrangement based on the compound rank is that the original expression gets rearranged so that scalar operands of any given invariance rank are combined with the developing partial result ahead of array operands of the same invariance rank.

Figure 17B:
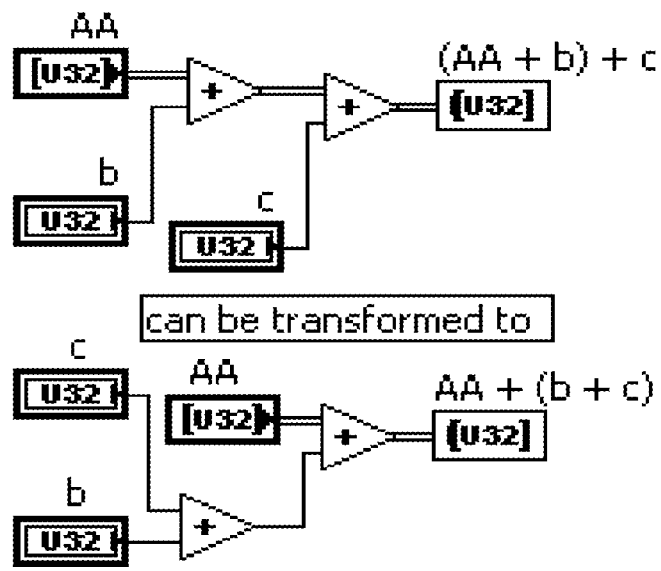
FIG. 17B shows LabVIEW block diagrams corresponding to an original expression (AA+b)+c and a rearranged expression AA+(b+c).

One embodiment of the CIV/SVA transform is illustrated by FIGS. 16 and 17.

FIG. 16 presents pseudocode for one embodiment of a function ScalarArrayCommutatePossible, that operates on a given binop and returns a Boolean that indicates whether or not the commute operation should be performed on the binop. To accomplish this, the function checks for the pattern (scalar1+(array+scalar2)) or the pattern (scalar1+(scalar2+array)). Either one of the patterns could be transformed to (array+(scalar+scalar)). But the following condition should be satisfied for scalar1 and array to be able to swap places:

(rank(array)==rank(scalar1))

AND (rank(array)>=rank(scalar2)).

If this condition is satisfied, the return value of the function is set to true, indicating that the commute operation should be performed on the given binop. In the special case that the current binop conforms to the second of the above-stated patterns, this function performs a commute operation on the binop that sources the xInput of the given binop.

FIG. 17 presents pseudocode for one embodiment of the function Reassociate, that operates on a given binop. Similar to the TP-extended embodiment shown in FIG. 14, this embodiment calls the Commutate function under the condition xInputRank>yInputRank. However, different from the TP-extended embodiment, this embodiment calls the Commutate function also under the condition:

(xInputRank=yInputRank)

AND

ScalarArrayCommutatePossible(binop)=True.

In some embodiments, the scalar-versus-array rearrangement could be extended to expressions including multidimensional arrays as well if the operations are both associative and commutative. For example, consider an expression ((AA+b)+c) as shown in the upper dataflow diagram of FIG. 17B, where AA is a two-dimensional array operand, and b and c are scalar operands. In accordance with the SVA transform described above, considering the fact that the operations involved are both commutative and associative, the expression can be transformed to obtain the expression (AA+(b+c)) as shown in the lower dataflow diagram of FIG. 17B.

Data Size Rearrangement

In some embodiments, the compiler may rearrange expressions based on a rank that is related to data size in combination with the invariance rank and dimensional rank. For example, given the expression ((u64+u32)+u16), where all the operands are of the same invariance and dimension rank, the compiler may rearrange this expression to obtain the modified expression (u64+(u32+u16)), where the operands of smaller size are combined first.

While the CIV transform (the baseline version or the extended version) rearranges expressions based on invariance rank, the present rearrangement would be based on the size of the data types.

On arrays: This rearrangement based on data size would be particularly useful when the expression involves array operands. For example, consider an expression ((A+B)+C) where A is of type [u64]. (The square bracket [T] notation representing an array whose elements are of type [T]). B is of type [u32] and C of type [u16]. If A, B and C are all constants, or all loop-invariants of same invariance rank, or all variants, the rearrangement based on invariance rank has no effect on the expression. Furthermore, all of them are of same dimension rank, which leaves no optimization opportunity for the scalar-versus-array rearrangement. However, since the data size of the elements of the arrays A, B and C are different, it would make sense to reassociate the expression as (A+(B+C)). This way, the intermediate result would consume half as much space as would be consumed without such a data-size rearrangement.

Figure 18:
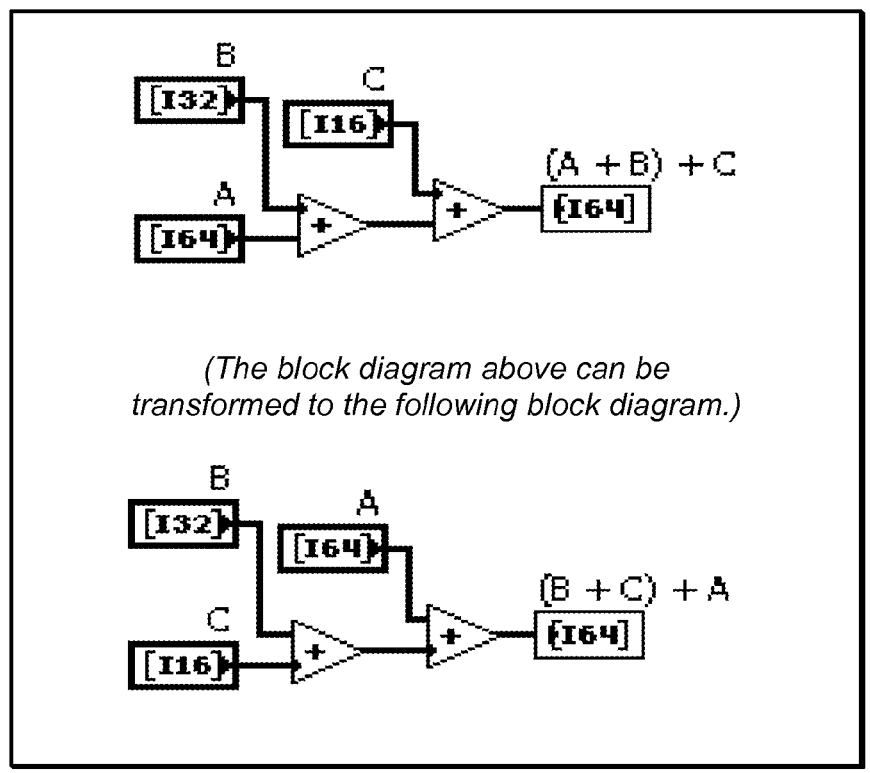
FIG. 18 shows LabVIEW block diagrams corresponding to an original expression ((A+B)+C) and a rearranged expression (A+(B+C)).

LabVIEW block diagrams corresponding to the original expression ((A+B)+C) and the rearranged expression (A+(B+C)) are shown in FIG. 18.

According to the data size ranking, data types having smaller data size are assigned a higher rank than data types having larger data size. Thus, a u16 scalar would be assigned the same rank as an array of u16 elements. However, an array of u16 elements would be assigned a higher rank that u32 scalar.

Prioritized Ranking Scheme

In some embodiments, the three forms of rearrangement described above, i.e., the rearrangements based respectively on invariance ranking, dimension ranking and data-size ranking, may be combined according to a prioritization scheme. The prioritization scheme gives priority to invariance rank over dimension rank, and to dimension rank over data size rank. In other words, each operand is ranked on multiple axes—invariance axis (v), dimension axis (d) and the data-size axis (s). As a result, the rank of any operand in an expression being rearranged would be a vector:

RankVector=<v,d,s>.

Comparison of two rank vectors for equality and greater-than relationships are defined as follows. To compare two RankVectors rv1 and rv2, they are compared starting with their v components, then with their d components iff v(rv1)=v(rv2), and finally with their s components iff d(rv1)=d(rv2) and v(rv1)=v(rv2). This prioritization scheme is intended to ensure that: a constant operand is ranked higher than a loop-invariant operand, which is ranked higher than a variant operand. Among loop-invariants, the greater the depth of loop-invariance of an operand, the higher is its rank. Among operands of the same invariance rank, a scalar operand is ranked above an array operand. Among operands of the same invariance rank and the same dimension rank, an operand whose generic element has smaller size is ranked above an operand whose generic element has larger size.

When rearranging operands, the prioritized ranking scheme tends to first rank them based on the invariance ranking. In case of a tie in the invariance rank, it uses the dimension rank to resolve the tie, and if the dimension rank also results in a tie, the data-size rank is finally used. Rearrangement based on this prioritized ranking scheme may be implemented using the same rearrangement algorithm as variously described above. For example, FIGS. 19-23 illustrate pseudocode for one embodiment of rearrangement according to the prioritized ranking scheme.

FIG. 19 presents pseudocode for an embodiment of the DoReassociation function. This embodiment is similar to the embodiment shown in FIG. 6. However, in this embodiment, the function returns a vector rank. The vector rank defaults to the vector of lowest rank, i.e., <KVARIANT, array, KLargestDataType>.

FIG. 20 presents pseudocode for an embodiment of the DoReassociation function.

FIG. 21 presents pseudocode for an embodiment of the Associate function. Note that type propagation is performed on the binops A and B after the operands have been reassociated.

FIG. 22 presents pseudocode for an embodiment of the Rank function, which computes a vector rank for a given terminal x (i.e., operand x).

FIG. 23 presents pseudocode for an embodiment of the Reassociate function. This embodiment is similar to the embodiment shown in FIG. 14. However, in this embodiment, the rank parameter is a vector. See the Rank function of FIG. 22.

An Example Scenario

Figure 24:
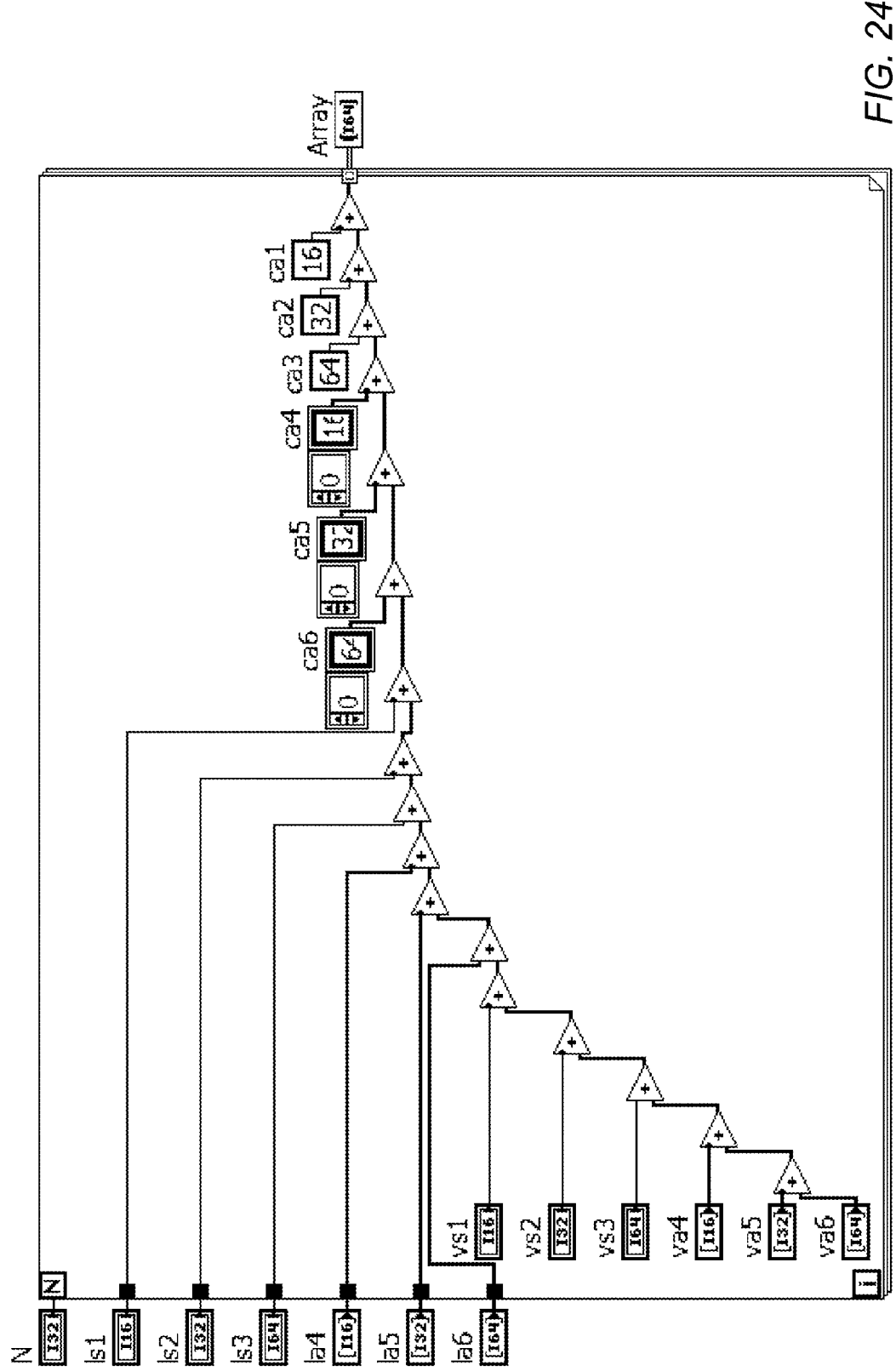
FIG. 24 gives an example of an algebraic expression (inside the loop) that is to be rearranged based on the three-level prioritized ranking scheme.
Figure 25:
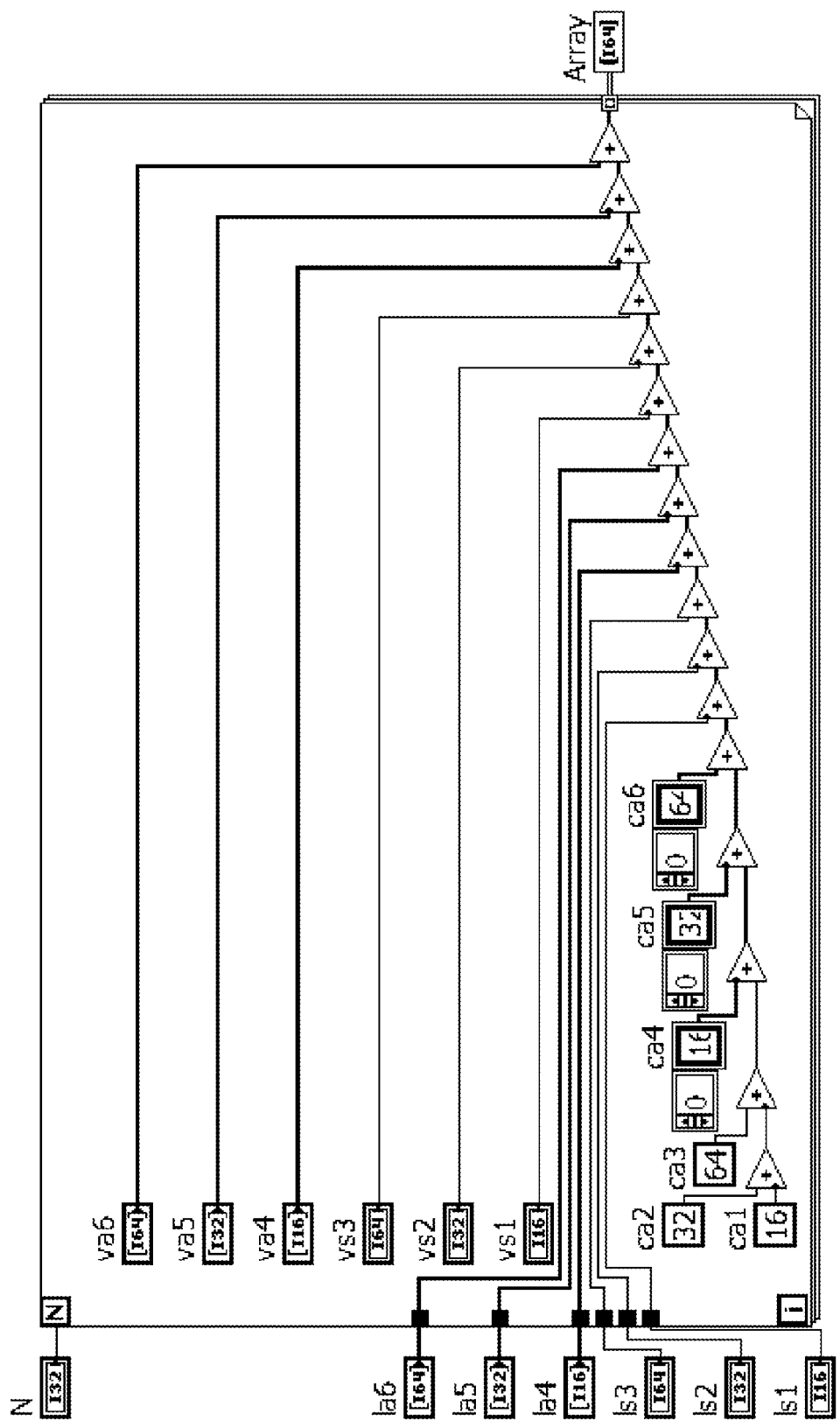
FIG. 25 shows the result of rearranging the expression of FIG. 24 according to the three-level prioritized ranking scheme.

Consider the example shown in FIG. 24. The algebraic expression inside the loop here is replete with coercions. The operands are a mixture of variants, loop-invariants and constants of all data types, some of them being scalars and the rest being arrays. For easy identification, the variants are named with the prefix 'v', loop invariants are named with the prefix 'l' and constants with 'c'. This prefix is followed by either the letter 'a' or 's' to tell if the operand is an array or a scalar respectively. If this algebraic expression is subjected to the baseline CIV transform, hardly any transformation will be done on the expression. However, applying the extended transform based on the prioritize-ranking scheme (e.g., as shown in FIGS. 19-23), the expression of FIG. 24 gets transformed to the expression of FIG. 25. Notice how first, the constant/loop-invariant/variant separation has been done, followed by the ranking of operands based on whether they are scalars or arrays and finally, the data-size has been considered to order the operands.

In one set of embodiments, a method for operating a compiler to rearrange expressions appearing in program code may involve the operations shown in FIG. 26.

At 2610, a computer may scan program code to identify an algebraic expression specified by the program code, e.g., as variously described above. The algebraic expression includes two or more mutually-compatible binary operations and three or more operands, where the three or more operands include two or more scalar operands and one or more array operands.

In a text-based language, the algebraic expression may involve subexpressions that occur in one or more program statements. For example, the expression (a+b)+(c+d) may be identified (or extracted) from program code including the following statements:

$x=a+b$ $y=c+d$ $z=x+y$.

Thus, it is not necessary that the entire expression occur in a single program statement.

In a graphical programming language such as LabVIEW, the algebraic expression may be extracted from a dataflow diagram or a graph representation of a dataflow diagram.

At 2615, the computer may operate on the algebraic expression, e.g., as variously described above, to obtain a final expression. The action of operating on the algebraic expression involves performing transformations on selected subexpressions of the algebraic expression, where the transformations include one or more commute transformations and one or more associate transformations. The final expression specifies an order of execution for the binary operations such that the two or more scalar operands are combined before the one or more array operands are combined in the final expression.

Each of the two or more binary operations includes a first input and a second input and an output. Furthermore, each of the first input and the second input is either one of the three or more operands or the output of another one of the two or more binary operations. For example, in the expression (A $Op_1$ B) $Op_2$ C, the first input of the binary operation $Op_2$ is the output of the binary operation $Op_1$, while the second input of the binary operation $Op_2$ is the operand C. As another example, in the expression (A $Op_1$ B) $Op_2$ (C $Op_3$ D), the first input of the binary operation $Op_2$ is the output of the binary operation $Op_1$, and the second input of the binary operation $Op_2$ is the output of binary operation $Op_3$. (These examples assume that the left operand of an operator is its first operand, and the right operand of an operator is its second operand. However, the opposite convention could just as well have been chosen.)

Each of the commute transformations acts to commute the first input and the second input of a corresponding one of the two or more binary operations in response to a determination that the first input of the corresponding binary operation is of scalar type and the second input of the corresponding binary operation is of array type. As noted above, an input of a binary operation may be the output of another binary operation. In that case, the input is classified as being of array type if the subexpression (of the algebraic expression) that corresponds to the input includes at least one array operand. Otherwise, it is classified as being of scalar type. For example, in the expression (scalar $Op_1$ scalar)$Op_2$(array $Op_3$ scalar), the first input of operation $Op_2$ is of scalar type, and the second input of operation $Op_2$ is of array type.

In some embodiments, the action of operating on the algebraic expression to obtain the final expression includes: (a) determining if a given operation $Op_1$ of the two or more binary operations satisfies a reassociation condition, where the reassociation condition is the condition that the first input of the operation $Op_1$ corresponds to the output of another operation $Op_2$ of the two or more binary operations, that the first input of the operation $Op_2$ is an array, that the second input of the operation $Op_2$ is a scalar $s_1$, and that the second input of the operation $Op_1$ is a scalar $s_2$; and (b) performing an associate transformation on the operations $Op_1$ and $Op_2$ in response to determining that the operation $Op_1$ satisfies the reassociation condition. After the associate transformation, the first and second inputs of the operation $Op_2$ are respectively the scalar $s_1$ and the scalar $s_2$, the first input of the operation $Op_1$ is the array, and the second input of the operation $Op_1$ is the output of the operation $Op_2$.

After performing the associate transformation, the computer may perform type propagation on the operations $Op_1$ and $Op_2$, e.g., as variously described above.

In some embodiments, the algebraic expression specifies an initial order of execution of the two or more binary operations. The action of operating on the algebraic expression to obtain the final expression may include operating on the two or more binary operations in a recursive fashion starting with a particular one of the two or more binary operations that is last according to the initial order of execution. The action of recursively operating on the two or more binary operations may be implemented as variously described above.

In one embodiment, the action of operating on the algebraic expression includes invoking a Reassociate function on an operation A of the two or more binary operations. (See, e.g., the Reassociate function shown in FIG. 17.) The Reassociate function computes an invariance rank Ry for the first input of the binary operation A and an invariance rank Rx for the second input of the binary operation A, and returns the maximum value of Rx and Ry. (If the first input of the binary operation A corresponds to the output of another binary operation, the process of determining the rank Ry may include invoking the Reassociate function on that other binary operation. Likewise, if the second input of the binary operation A corresponds to the output of another binary operation, the process of determining the rank Rx may include invoking the Reassociate function on that other binary operation.) The Reassociate function commutes the first and second inputs of the binary operation A if Rx>Ry OR if (Rx==Ry) and the binary operation A satisfies a reassociation condition. In one embodiment, the reassociation condition is the condition determined by the ScalarArrayCommutatePossible function of FIG. 16. Furthermore, if the binary operation A satisfies a certain compound condition, the Reassociate function may invoke an Associate function (e.g., the Associate function shown in FIG. 13). The compound condition may be the condition that: (a) there exists a binary operation B whose output feeds the first input of the binary operation A, and (b) the output of binary operation B is consumed as an input only once in the program code, and (c) the binary operation B is of the same or similar kind as the binary operation B. In one embodiment, the Associate function transforms the inputs of the binary operations A and B according to the following rule: (u B v) A w→u A (v B w). After having transformed the inputs, the Associate function may invoke the Reassociate function on the binary operation A.

In some embodiments, the computer may generate modified program code that includes the final expression, e.g., by replacing the algebraic expression in the original program code (or a copy of the original program code) with the final expression. Furthermore, the computer may generate executable code based on the modified program code. The executable code includes a portion that corresponds to the final expression. That portion of the executable code respects the order of execution specified by the final expression.

In some embodiments, the program code being scanned is (or is expressed in) a program representation that is intermediate between a user-specified program and machine executable code. For example, in one embodiment, the program code is expressed in the dataflow intermediate representation (DFIR) of LabVIEW.

In one embodiment, the actions of scanning the program code and operating on the algebraic expression are performed in response to detecting a compiler directive in the program code, where the compiler directive has been inserted in the program code by a user.

In some embodiments, the algebraic expression is (or corresponds to) a binary tree T whose leaf nodes represent the three or more operands and whose non-leaf nodes represent the two or more binary operations. (In a graphical programming language, the code scanning process 2610 may involve traversing a graphical program to identify binary expression trees, e.g., as variously described above. However, even in a text-based programming language, it may be desirable to represent algebraic expressions as binary trees.) Each commute transformation may operate on a corresponding binary operation Op (of the two or more binary operations) to exchange the two subtrees that correspond to the binary operation Op, i.e., that are underneath the binary operation Op. In addition, each associate transform may operate on a corresponding pair of the two or more binary operations based on an associative law, where the pair includes a first binary operation and a second binary operation that are related as parent and immediate child with respect to the binary tree.

In one embodiment, the action of operating on the algebraic expression is applied recursively to the binary tree starting with one of the three or more binary operations that corresponds to a root of the binary tree.

In some embodiments, the computer may generate modified program code that includes the final expression, e.g., by replacing the algebraic expression in the original program code (or a copy of the original program code) with the final expression. Furthermore, the computer may display the modified program code via a display device. Thus, the user is able to see how the algebraic expression has been rearranged.

In one set of embodiments, a computer-implemented method for operating a compiler to rearrange expressions appearing in program code may involve the operations shown in FIG. 27.

At 2710, a computer may scan program code to identify an algebraic expression specified by the program code, e.g., as variously described above. The algebraic expression includes two or more mutually-compatible binary operations and three or more operands, where the three or more operands include two or more scalar operands and one or more array operands.

At 2715, the computer may operate on the algebraic expression to obtain a final expression, e.g., as variously described above. The action of operating on the algebraic expression may include computing a rank vector for each of the three or more operands, where the rank vector for any given one of the three or more operands includes a first component that is (or is based on) an invariance rank of the operand and a second component that is (or is based on) a dimension of the operand. (See, e.g., the above discussions of invariance rank and dimensional rank.) The action of operating on the algebraic expression to obtain the final expression may also include performing transformations on selected subexpressions of the algebraic expression, where the transformations include one or more commute transformations and one or more associate transformations. Each of the commute transformations exchanges the input operands of a corresponding one of the two or more binary operations to order the input operands according to an ordering of possible states of the rank vector. The ordering of possible states gives precedence to the first component over the second component.

The final expression specifies an order of execution for the two or more binary operations such that the three or more operands are combined in an order that agrees with the ordering of possible states of the rank vector. Because the ordering of possible states give precedence to the invariance rank over the dimensional rank, the operands of the final expression are combined in order of their invariance rank, and among operands of the same invariance rank, in order of their dimension (i.e., scalars before arrays).

Each of the two or more binary operations includes a first input and a second input and an output, where each of the inputs is either one of the three or more operands or the output of another one of the two or more binary operations. For example, in the expression u A (v B w), the second input operand of the operation A is the output operand (v B w) produced by the operation B. (Note that the first input of operation A is a primitive operand, i.e., is not the output of any other operation.) As another example, in the expression (uAv)B(wCx), the first input operand of the operation B is the output of operation A, and the second input operand of the operation B is the output of operation C.

After performing the commute transformation on a given one of the two or more binary operations, the computer may determine if the given binary operation satisfies a reassociate condition. The reassociate condition may be a logical AND combination of two or more subconditions, e.g., as variously described above. The two or more subconditions may include: a first subcondition that the first input of the given binary operation is the output of a second one of the two or more binary operations; and a second subcondition that the output of the second binary operation is not used an as input in the program code other than as the first input of the given binary operation. In some embodiments, the two or more subconditions may include a third subcondition, where the third subcondition is the Boolean result of a test to determine if the second binary operation is of the same (or similar) kind as the given binary operation. For example, if the given binary operation is addition, the second binary operation should be mutually-compatible with addition.

The reassociate condition includes the condition that the first input of the given binary operation is the output of a second one of the two or more binary operations. (See, e.g., the reassociate condition as variously described above.) The computer may perform an associate transformation on the given binary operation and the second binary operation in response to determining that the given binary operation satisfies the reassociate condition.

In some embodiments, the computer may perform type propagation on the given binary operation and the second binary operation (e.g., as variously described above) after the action of performing the associate transformation on the given binary operation and the second binary operation.

In some embodiments, the rank vector for any given one of the three or more operands also includes a third component that is based on a data size associated with a generic element of the given operand, where the ordering of possible states of the rank vector gives precedence to the second component over the third component, e.g., as variously described above. (See especially the above discussion of the prioritized ranking scheme in connection with FIGS. 19-23.)(The generic element of a scalar is the scalar itself. The generic element of an array is any element of the array.) Because the order of execution specified by the final expression agrees with the ordering of possible states of the rank vector, that order of execution will dictate that the three or more operands be combined in the order of their invariance rank. Among operands of the same invariance rank, the operands are combined in the order of their dimensional rank (i.e., scalars before arrays). Among operands of the same invariance rank and same dimensional rank, the operands are combined in the order of their data-size rank (i.e., smaller size operands before larger size operands).

In some embodiments, the algebraic expression being operated on specifies an initial order of execution of the two or more binary operations. The action of operating on the algebraic expression may include operating on the two or more binary operations in a recursive fashion (e.g., as variously described above), starting with a particular one of the two or more binary operations that is last according to the initial order of execution.

In some embodiments, the computer may generate modified program code that includes the final expression, e.g., by replacing the algebraic expression in the program code with the final expression. Furthermore, the computer may generate executable code from the modified program code, where the executable code includes a portion that corresponds to the final expression. That portion of the executable code respects the order of execution specified by the final expression.

In some embodiments, the program code is (or, is expressed in terms of) a program representation that is intermediate between a user-specified program and machine executable code. For example, in one embodiment, the program code is expressed in terms of the dataflow intermediate representation (DFIR) of LabVIEW.

In some embodiments, the computer may generate modified program code that includes the final expression, e.g., by replacing the algebraic expression in the original program code (or a copy of the original program code) with the final expression. The computer may also display the modified program code via a display device. Thus, the user is able to see the final expression in the context of his/her program.

Any of the various embodiments described herein may be realized in a text-based programming language (such as C, C++, Java, Perl, Ada, Fortran) and/or in a graphical programming language (such as LabVIEW). Furthermore, the program code that is operated on by any of the various embodiments described herein may be written in a text-based language and/or in a graphical programming language.

In some embodiments, an algebraic expression occurring in the program code may include operations that take more than two operands. For example, LabVIEW provides support for compound-arithmetic nodes such as a 5-way adder, i.e., an adder with 5 inputs. As a preprocessing step, a compiler may operate on the expression to convert any such operations (i.e., any operation taking more than two operands) within the expression into a configuration of binary operations. Thus, a 3-way adder may be converted into a cascade of two binary additions: ((a+b)+c). Similarly, a 4-way multiplier may be converted into a configuration such as: (a+(b+(c+d))) or ((a+b)+(c+d)) or (a+(b+c))+d, etc. The preprocessed expression (including only binary operations) may then be subjected to any of the rearrangement method described herein.

Figure 28:
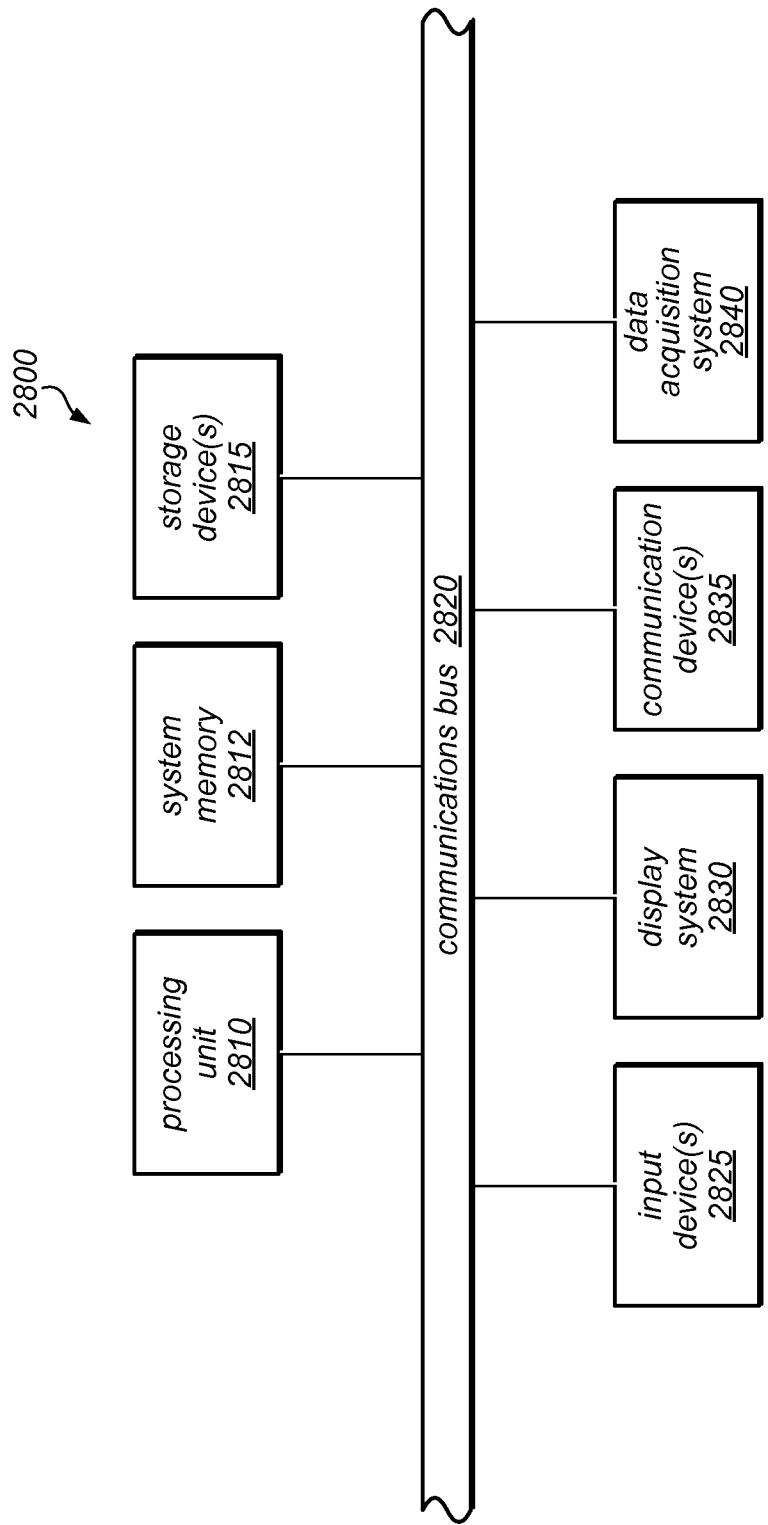
FIG. 28 illustrates one embodiment of a computer system may be used to execute any of the various method embodiments described herein.

FIG. 28 illustrates one embodiment of a computer system 2800 that may be used to perform any of the method embodiments described herein, or, any combination of the method embodiments described herein, or any subset of any of the method embodiments described herein, or, any combination of such subsets.

Computer system 2800 may include a processing unit 2810, a system memory 2812, a set 2815 of one or more storage devices, a communication bus 2820, a set 2825 of input devices, and a display system 2830.

System memory 2812 may include a set of semiconductor devices such as RAM devices (and perhaps also a set of ROM devices).

Storage devices 2815 may include any of various storage devices such as one or more memory media and/or memory access devices. For example, storage devices 2815 may include devices such as a CD/DVD-ROM drive, a hard disk, a magnetic disk drive, magnetic tape drives, etc.

Processing unit 2810 is configured to read and execute program instructions, e.g., program instructions stored in system memory 2812 and/or on one or more of the storage devices 2815. Processing unit 2810 may couple to system memory 2812 through communication bus 2820 (or through a system of interconnected busses). The program instructions configure the computer system 2800 to implement a method, e.g., any of the method embodiments described herein, or, any combination of the method embodiments described herein, or, any subset of any of the method embodiments described herein, or any combination of such subsets.

Processing unit 2810 may include one or more processors (e.g., microprocessors).

One or more users may supply input to the computer system 2800 through the input devices 2825. Input devices 2825 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 2830 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 2800 may include other devices, e.g., devices such as one or more graphics accelerators, one or more speakers, a sound card, a video camera and a video card.

In some embodiments, computer system 2800 may include one or more communication devices 2835, e.g., a network interface card for interfacing with a computer network.

In some embodiments, the communication devices may include a reconfigurable I/O (RIO) board that includes one or more programmable hardware elements (PHEs), one or more A/D converters and perhaps additional circuitry. The RIO board is programmable to achieve a user-desired configuration of input and/or output processing, e.g., via a program written using LabVIEW FPGA. In some embodiments, the reconfigurable I/O board is one of the RIO boards provided by National Instrument Corporation.

The computer system may be configured with a software infrastructure including an operating system, one or more compilers for one or more corresponding programming languages, and perhaps also one or more graphics APIs (such as OpenGL®, Direct3D, Java 3D™). Any or all of the compilers may be configured to perform expression rearrangement according to any or all of the method embodiments described herein. In some embodiments, the software infrastructure may include LabVIEW and/or LabVIEW FPGA, which are software products of National Instruments Corporation.

In some embodiments, the computer system 2800 may be configured for coupling to a data acquisition system 2840. The data acquisition system 2840 is configured to receive analog inputs signals, to digitize the analog input signals, and to make those digitized signals available to the computer system 2800. The data acquisition system 2840 may operate under the control of the software executing on processor 2810.

Figure 29:
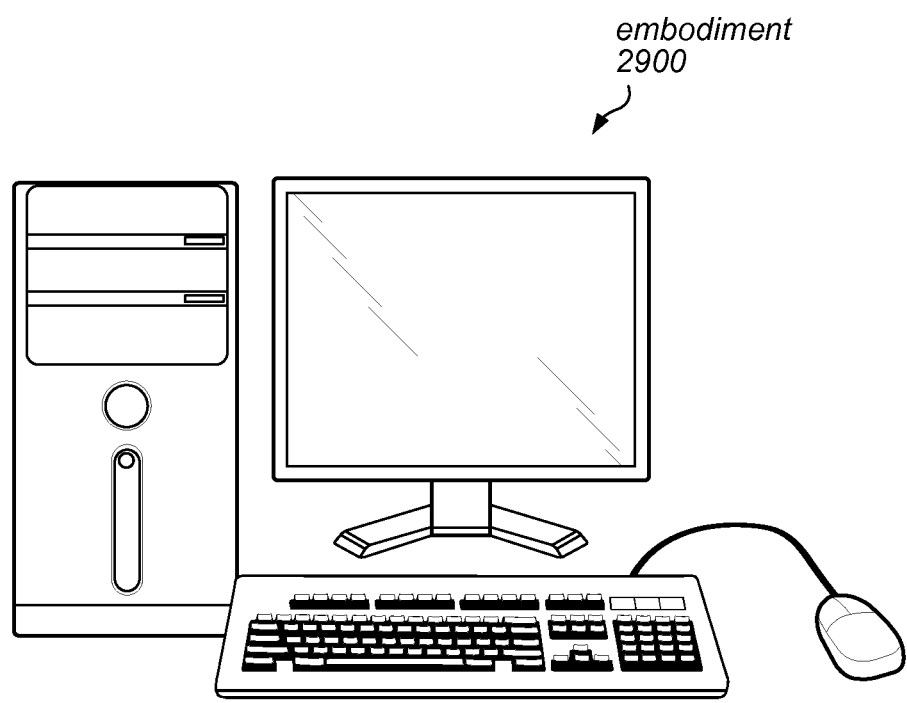
FIG. 29 illustrate one possible embodiment of the computer system of FIG. 28.

FIG. 29 illustrates one possible embodiment 2900 for computer system 2800.

What is claimed is:

1. A method for operating a compiler, the method comprising:
utilizing a computer to perform:
scanning program code to identify a first algebraic expression specified by the program code, wherein the first algebraic expression includes two or more mutually-compatible binary operations and three or more input operands, wherein the three or more input operands include two or more scalar operands and one or more array operands; and
operating on the first algebraic expression to obtain a final algebraic expression by:
(a) computing a rank vector for each of the three or more input operands, wherein the rank vector for any given one of the three or more input operands includes a first component that is based on an invariance rank of the input operand and a second component that is based on a dimension of the input operand, and
(b) performing transformations on selected subexpressions of the first algebraic expression, wherein the transformations include one or more commute transformations and one or more associate transformations, wherein each of the commute transformations exchanges input operands of a corresponding one of the two or more binary operations to order the input operands according to an ordering of possible states of the rank vector, wherein the ordering of possible states gives precedence to the first component over the second component;
wherein the final algebraic expression specifies an order of execution for the two or more binary operations such that the three or more input operands are combined in an order that agrees with the ordering of possible states of the rank vector.

2. The method of claim 1, wherein the two or more mutually-compatible binary operations are instances of a single operator.

3. The method of claim 1, wherein each of the two or more binary operations includes a first input and a second input and an output, wherein each of the first input and the second input is either one of the three or more input operands or the output of another one of the two or more binary operations, wherein said operating on the first algebraic expression includes:
after performing the commute transformation on a first one of the two or more binary operations, determining if the first binary operation satisfies a reassociate condition, wherein the reassociate condition is a logical combination of at least two subconditions, wherein the at least two subconditions includes a first subcondition that the first input of the first binary operation is the output of a second one of the two or more binary operations, and a second subcondition that the output of the second binary operation is not used an as input other than as the first input of the first binary operation; and
performing an associate transformation on the first and second binary operations in response to determining that the first binary operation satisfies the reassociate condition.

4. The method of claim 3, further comprising:
performing type propagation on the first and second binary operations after said performance of the associate transformation on the first and second binary operations.

5. The method of claim 1, wherein the rank vector for any given one of the three or more input operands also includes a third component that is based on a data size associated with a generic element of the given input operand, wherein the ordering of possible states of the rank vector gives precedence to the second component over the third component.

6. The method of claim 1, further comprising:
generating modified program code that includes the final algebraic expression;

generating executable code from the modified program code, wherein the executable code includes a portion that corresponds to the final algebraic expression, where said portion of the executable code respects the order of execution specified by the final algebraic expression.

7. A non-transitory computer-readable memory medium, wherein the memory medium stores program instructions, wherein the program instructions, when executed by a computer system, cause the computer system to:
scan program code to identify a first algebraic expression specified by the program code, wherein the first algebraic expression includes two or more mutually-compatible binary operations and three or more input operands, wherein the three or more input operands include two or more scalar operands and one or more array operands; and
operate on the first algebraic expression to obtain a final algebraic expression by:
(a) computing a rank vector for each of the three or more input operands, wherein the rank vector for any given one of the three or more input operands includes a first component that is based on an invariance rank of the input operand and a second component that is based on a dimension of the input operand, and
(b) performing transformations on selected subexpressions of the first algebraic expression, wherein the transformations include one or more commute transformations and one or more associate transformations, wherein each of the commute transformations exchanges input operands of a corresponding one of the two or more binary operations to order the input operands according to an ordering of possible states of the rank vector,
wherein the ordering of possible states gives precedence to the first component over the second component;
wherein the final algebraic expression specifies an order of execution for the two or more binary operations such that the three or more input operands are combined in an order that agrees with the ordering of possible states of the rank vector.

8. The memory medium of claim 7, wherein the two or more mutually-compatible binary operations are instances of a single operator.

9. The memory medium of claim 7, wherein the rank vector for any given one of the three or more input operands also includes a third component that is based on a data size associated with a generic element of the given input operand, wherein the ordering of possible states of the rank vector gives precedence to the second component over the third component.

10. The memory medium of claim 7, wherein the first algebraic expression specifies an initial order of execution of the two or more binary operations, wherein said operating on the first algebraic expression includes operating on the two or more binary operations in a recursive fashion starting with a particular one of the two or more binary operations that is last according to the initial order of execution.

11. The memory medium of claim 7, wherein the program code is a program representation that is intermediate between a user-specified program and machine executable code.

12. The memory medium of claim 7, wherein the program instructions, when executed by the computer system, further cause the computer system to:
generate modified program code that includes the final algebraic expression; and
display the modified program code via a display device.

13. A computer system comprising:
a processor; and
memory storing program instructions, wherein the program instructions, when executed by the processor, cause the processor to:
scan program code to identify a first algebraic expression specified by the program code, wherein the first algebraic expression includes two or more mutually-compatible binary operations and three or more input operands, wherein the three or more input operands include two or more scalar operands and one or more array operands; and
operate on the first algebraic expression to obtain a final algebraic expression by:
(a) computing a rank vector for each of the three or more input operands, wherein the rank vector for any given one of the three or more input operands includes a first component that is based on an invariance rank of the input operand and a second component that is based on a dimension of the input operand, and
(b) performing transformations on selected subexpressions of the first algebraic expression, wherein the transformations include one or more commute transformations and one or more associate transformations, wherein each of the commute transformations exchanges input operands of a corresponding one of the two or more binary operations to order the input operands according to an ordering of possible states of the rank vector, wherein the ordering of possible states gives precedence to the first component over the second component;
wherein the final algebraic expression specifies an order of execution for the two or more binary operations such that the three or more input operands are combined in an order that agrees with the ordering of possible states of the rank vector.

14. The computer system of claim 13, wherein the two or more mutually-compatible binary operations are instances of a single operator.

15. The computer system of claim 13, wherein the rank vector for any given one of the three or more input operands also includes a third component that is based on a data size associated with a generic element of the given input operand, wherein the ordering of possible states of the rank vector gives precedence to the second component over the third component.

16. The computer system of claim 13, wherein the first algebraic expression specifies an initial order of execution of the two or more binary operations, wherein said operating on the first algebraic expression includes operating on the two or more binary operations in a recursive fashion starting with a particular one of the two or more binary operations that is last according to the initial order of execution.

17. The computer system of claim 13, wherein the program code is a program representation that is intermediate between a user-specified program and machine executable code.

18. The computer system of claim 13, wherein the program instructions, when executed by the processor, further cause the processor to:
generate modified program code that includes the final algebraic expression; and
display the modified program code via a display device.

19. The computer system of claim 13, wherein the first component increases as depth of loop invariance of the input operand increases, wherein the second component decreases as dimension of the input operand increases.

20. The computer system of claim 19, wherein the rank vector also includes a third component that is based on data size associated with a generic element of the input operand, wherein the ordering of possible states of the rank vector gives precedence to the second component over the third component.

* * * * *